US010922594B2

(12) United States Patent
Shigeta

(10) Patent No.: US 10,922,594 B2
(45) Date of Patent: Feb. 16, 2021

(54) GAME TOKEN TRAY, TABLE GAME MANAGEMENT SYSTEM, GAME TOKEN TRAY SYSTEM, AND GAME TOKEN MANAGEMENT METHOD

(71) Applicant: ANGEL PLAYING CARDS CO., LTD., Shiga (JP)

(72) Inventor: Yasushi Shigeta, Shiga (JP)

(73) Assignee: ANGEL PLAYING CARDS CO., LTD.

( * ) Notice: Subject to any disclaimer, the term of this patent is extended or adjusted under 35 U.S.C. 154(b) by 0 days.

(21) Appl. No.: 16/997,099

(22) Filed: Aug. 19, 2020

(65) Prior Publication Data
US 2020/0394480 A1 Dec. 17, 2020

Related U.S. Application Data

(63) Continuation of application No. 16/485,698, filed as application No. PCT/JP2018/004746 on Feb. 9, 2018, now Pat. No. 10,783,416.

(30) Foreign Application Priority Data

Feb. 13, 2017 (JP) ................. 2017-024424

(51) Int. Cl.
G06K 19/04 (2006.01)
A63F 11/00 (2006.01)
(Continued)

(52) U.S. Cl.
CPC ........ G06K 19/047 (2013.01); A63F 11/0002 (2013.01); G06K 7/1097 (2013.01);
(Continued)

(58) Field of Classification Search
None
See application file for complete search history.

(56) References Cited

U.S. PATENT DOCUMENTS 5,735,742 A 4/1998 French
8,285,034 B2 10/2012 Rajaraman et al.
(Continued)

FOREIGN PATENT DOCUMENTS

GB 2369534 A 5/2002
JP 2014203139 A 10/2014
(Continued)

OTHER PUBLICATIONS

International Search Report dated Mar. 13, 2018 issued in corresponding PCT Application PCT/JP2018/004746.

Primary Examiner — Adolf Dsouza
(74) Attorney, Agent, or Firm — Norton Rose Fulbright US LLP

(57) ABSTRACT

A game token tray system includes a game token tray having a dual tray structure in which a game token is stored. The game token tray system includes a double tray including a lower tray and an upper tray stacked on the lower tray to store a game token provided with an RF tag in which tag information is stored, a camera that acquires tray image data by imaging the game token stored in the upper tray, an RFID reading device that reads the tag information from the RF tag of the game token stored in the lower tray, and a game recording device that records the tray image data and/or an image analysis result of the tray image data about the game token stored in the upper tray and records the tag information read by the RFID reading device about the game token stored in the upper tray.

15 Claims, 21 Drawing Sheets

(51) Int. Cl.
*G06K 7/10* (2006.01)
*G07F 17/32* (2006.01)
*A63F 3/00* (2006.01)

(52) U.S. Cl.
CPC ........ *G07F 17/322* (2013.01); *G07F 17/3251* (2013.01); *A63F 2003/00164* (2013.01); *A63F 2003/00703* (2013.01)

(56) References Cited

U.S. PATENT DOCUMENTS

| | | | |
|---|---|---|---|
| 2007/0021171 A1* | 1/2007 | Pavlovich | G07F 17/3223 463/16 |
| 2014/0291399 A1 | 10/2014 | Koyama | |
| 2018/0075690 A1* | 3/2018 | Moore | A63F 3/00157 |
| 2018/0114406 A1 | 4/2018 | Shigeta | |
| 2018/0357850 A1* | 12/2018 | Moore | G07F 17/322 |
| 2019/0130700 A1 | 5/2019 | Oguchi et al. | |

FOREIGN PATENT DOCUMENTS

| | | |
|---|---|---|
| JP | 2015164057 A | 9/2015 |
| JP | 2015222589 A | 12/2015 |
| JP | 6049118 B1 | 12/2016 |
| WO | 2017022767 A1 | 2/2017 |
| WO | 2017023826 A1 | 2/2017 |

* cited by examiner

GAME TOKEN TRAY, TABLE GAME MANAGEMENT SYSTEM, GAME TOKEN TRAY SYSTEM, AND GAME TOKEN MANAGEMENT METHOD

CROSS-REFERENCE TO RELATED APPLICATIONS

This application is a continuation of U.S. application Ser. No. 16/485,698 filed Aug. 13, 2019 which is a national phase application under 35 U.S.C. § 371 of International Application No. PCT/JP2018/004746 filed Feb. 9, 2018, which claims the benefit of JP Application No. 2017-024424 filed Feb. 13, 2017, the contents of each of which are incorporated herein by reference.

TECHNICAL FIELD

The present invention relates to a game token tray that stores a game token.

BACKGROUND ART

Conventionally, in game arcades such as a casino, a cashable game token is used, and a bet and a refund of a game are performed by the game token. In U.S. Pat. No. 5,735,742, an automatic settlement system that automatically monitors all transactions of the game token in a casino is used. In the automatic settlement system, an RF tag is embedded in the game token, and an electronic system including an antenna embedded in a game table is used to read the RF tag embedded in the game token. The antenna is also provided under the game token tray, and the RF tags of a plurality of game tokens in the game token tray are also collectively read in a contactless manner.

However, in reading the RF tag, because the plurality of RF tags are collectively read by one antenna, where the plurality of game tokens including the plurality of read RF tags are in a reading area (for example, a game token tray) is not understood. For this reason, for example, when a forged fraud game token is mixed in the game token tray in an settlement process of the game, although it can be recognized that the fraud game token exist in the game token tray, it cannot be determined where the fraud game token comes from, and it is not possible to specify a person who uses the forged game token.

In the game token tray having a double tray structure in which the upper tray and the lower tray are overlapped, when the RF tags are collectively read with respect to a plurality of game tokens stored in the upper tray and a plurality of game tokens stored in the lower tray, the RF tag of the game token stored in the upper tray cannot be distinguished from the RF tag of the game token stored for the lower tray in the plurality of read RF tags. That is, the movement of the game token between the upper tray and the lower tray cannot be grasped.

In the procedure for collectively reading the RF tags of the plurality of game tokens, even if the plurality of game tokens include the game token having the RF tag that is out of order or the game token that does not have the RF tag, the game token having the RF tag that is out of order or the game token that does not have the RF tag cannot be detected.

In the procedure for reading the RF tag, an error is generated in reading the RF tag depending on an angle and an orientation of the game token. In particular, the RF tag is hardly read depending on the angle for the game token stored in an inclined manner in the game token tray.

In the procedure for reading the RF tag, because the RF signal is read in a noncontact manner by outputting a radio wave from an antenna, a dealer or a player will be exposed to the radio wave for a long time, and an influence of the radio wave on a human body is concerned.

The present invention has been made in view of the above problems, and an object of the present invention is to provide a novel game token tray system including a game token tray having a double tray structure in which the game token is stored.

SUMMARY OF INVENTION

According to an aspect of the present invention, a game token tray provided on a game table and holding a game token, includes: an upper tray used to take in and out the game token during settlement of a game; and a lower tray disposed below the upper tray and storing the game token for replenishment to the upper tray. The game token includes a plastic layer, a specific color capable of specifying a type of the game token is at least partially provided in the game token, a printing layer representing the type of the game token is provided in upper and lower surfaces of the game token, an individually identifiable side code is given to a side surface of the game token, the game token has a structure in which an RF tag is fixed to the plastic layer, and a configuration in which the type of the game token can be specified by the specific color, an upper portion of the upper tray is open such that the game token placed on the upper tray can be imaged by a camera, and the RF tag of each game token placed on the lower tray can be read by an RFID reading device, the upper tray and the lower tray can take two modes of a state in which the upper tray and the lower tray are overlapped and an open state in which the game token on the lower tray can be taken in and out, and the RFID reading device does not read the RF tag of the game token placed on the upper tray while the upper tray and the lower tray are overlapped.

After the game is over, the dealer pays out the game token to the player from the upper tray, and stores the game token collected from the player in the upper tray. Thus, a fluctuation (increase and decrease) of the game token stored for each game is generated in the upper tray. Thus, whether the increase or decrease of the game token stored in the upper tray is correctly performed is desirably grasped for each game. With the above configuration, the fluctuation of the game token in the upper tray frequently generated in this way can be grasped based on tray image data.

The dealer moves the plurality of (for example, units of 100 pieces of) game tokens from the upper tray to the lower tray in timing the game tokens increase and cannot be stored in the upper tray, and conversely the dealer moves the plurality of (for example, units of 100 pieces of) game tokens from the lower tray to the upper tray in timing the game tokens in the upper tray are exhausted. As described above, in the lower tray, the fluctuation (increase or decrease) of the game token is not generated as frequent as the upper tray (for example, several times in casino business hours per day). Thus, whether the game token scheduled for the lower tray exists continuously is desirably checked for the lower tray. With the above configuration, the existence of the game token, which is accommodated in the lower tray and cannot visually be recognized from the outside, can be grasped by reading tag information from the RF tag.

With the above configuration, for the upper tray used to take in and out the game token during the settlement of the game, the position and movement of the game token can be recognized to detect the fraud by performing the imaging with the camera. For the lower tray in which the game token for replenishment is stored, the RF tag can be read even if the upper tray is stacked, and the RF tag is not read for the game token of the upper tray. Thus, the game token stored in the lower tray can be grasped by reading the RF tag. As described above, because the game token of the upper tray and the game token of the lower tray can be grasped, the movement of the game token between the upper tray and the lower tray can also be grasped, and the fraud can be detected in the movement of the game token. As to the upper tray, the game token in which the RF tag is broken or the game token that does not include the RF tag can also be detected.

In the game token tray, a position of the side code of each game token in the upper tray may be specifiable by specifying the side code.

With this configuration, which game token is located at which position of the upper tray can be specified.

In the game token tray, the side code of the game token may be printed using ink that is invisible by visible light.

With this configuration, forgery becomes difficult to further enhance security, and a freedom degree of design of the side surface (visible by visible light) of the game token can be secured.

In the game token tray, the side code may be printed by ink absorbing infrared light.

With this configuration, the forgery becomes difficult to further enhance the security, the freedom degree of the design of the side surface (visible by visible light) of the game token can be secured, and the side code can be imaged with an infrared camera.

In the game token tray, the side code may be provided in a plurality of lines on the side surface.

With this configuration, the visibility of the side code by the camera can be improved, and a circumferential length per side code can be shortened, or a more complicated code can be created within the same circumferential length.

The game token tray may further include a database in which the side code in each of the plurality of game tokens is associated with tag information stored in the RF tag.

With this configuration, whether the side code of the game token corresponds to the tag information about the RF tag can be determined by referring to the database.

In the game token tray, the game token may have a configuration in which light color layers are provided on both sides of the specific color layer.

With this configuration, the specific color layer is sandwiched between the light color layers, the plurality of game tokens are stacked, and the specific color layers of adjacent game tokens are not continuous when observed from the side surface, so that the number of game tokens can accurately be grasped.

According to an aspect of the present invention, a management system for a table game that uses a game table, includes: a game token including a plastic layer, a specific color capable of specifying a type of the game token being at least partially provided in the game token, a printing layer representing the type of the game token being provided in upper and lower surfaces of the game token, a side surface to which an individually identifiable side code is given, the game token having a structure in which an RF tag is fixed to the plastic layer, and a configuration in which the type of the game token being able to be specified by the specific color; a game token tray provided on the game table and holding the game token; a camera that images and records the game token placed on the game token tray; an RFID reading device that reads the RF tag of each game token placed on the game token tray; and a management control device that specifies and stores the type and a number of the game token on the game token tray using an imaging result of the camera and a reading result of the RFID reading device. The game token tray includes an upper tray used to take in and out the game token during settlement of a game and a lower tray disposed below the upper tray and storing the game token for replenishment to the upper tray, the upper tray and the lower tray can take two modes of a state in which the upper tray and the lower tray are overlapped and an open state in which the game token on the lower tray can be taken in and out, and an upper portion of the upper tray is open such that the game token placed on the upper tray can be imaged by the camera, and the RF tag of each game token placed on the lower tray can be read by the RFID reading device.

With this configuration, for the upper tray used to take in and out the game token during the settlement of the game, the position and movement of the game token can be recognized to detect the fraud by performing the imaging with the camera. For the lower tray in which the game token for replenishment is stored, the RF tag can be read even if the upper tray is stacked. Thus, the game token stored in the lower tray can be grasped by reading the RF tag. As to the upper tray, the game token in which the RF tag is broken or the game token that does not include the RF tag can also be detected.

In the management system, the management control device may specify a position of the side code of each game token in the upper tray by specifying the side code.

With this configuration, which game token is located at which position of the upper tray can be specified.

In the management system, the RFID reading device may not read the RF tag of the game token placed on the upper tray while the upper tray and the lower tray are overlapped.

With this configuration, because the RF tag is not read for the game token of the upper tray, the game token of the upper tray and the game token of the lower tray can be grasped, and the movement of the game token between the upper tray and the lower tray can also be grasped.

The management system may further include a database in which the side code in each of the plurality of game tokens and the RFID are associated with each other.

With this configuration, whether the side code of the game token corresponds to the tag information about the RF tag can be determined by referring to the database.

In the management system, the side code may be printed by ink that is invisible by visible light.

With this configuration, forgery becomes difficult to further enhance security, and a freedom degree of design of the side surface (visible by visible light) of the game token can be secured.

In the management system, the side code may be printed by ink absorbing infrared light.

With this configuration, the forgery becomes difficult to further enhance the security, the freedom degree of the design of the side surface (visible by visible light) of the game token can be secured, and the side code can be imaged with an infrared camera.

In the management system, the side code may be provided in a plurality of lines on the side surface.

With this configuration, the visibility of the side code can be improved, and a circumferential length per side code can be shortened, or a more complicated code can be created within the same circumferential length.

In the management system, the game token may have a configuration in which light color layers are provided on both sides of the specific color layer.

With this configuration, the visibility of the side code by the camera can be improved.

In the management system, the management control device may determine a fraud game token when the side code is different from a previously-registered side code.

With this configuration, the fraud game token that does not have the correct side code can be detected.

In the management system, the management control device may output a determination result when determining the fraud game token in the upper tray collected by a game table dealer, and reproduce imaging recording of the fraud game token using a camera.

With this configuration, the imaging record of the fraud game token can be reproduced to analyze a fraud action.

In the management system, the management control device may use the camera to determine a location, from which the game token collected by the game table dealer and placed on the upper tray comes, on the game table, and reproduce the imaging recording of movement of the game token using the camera.

With this configuration, a person who uses the fraud game token or the position of the person can be specified.

In the management system, the camera may also image a bill exchanged for the game token, and the management control device can specify the type and the number of the game token on the upper tray to be decreased by the exchange between the game token on the game token tray and the bill using an imaging result of the bill, and perform comparison and measurement with an actual total amount of the game tokens on the game token tray.

With this configuration, whether the exchange between the bill and the game token is correctly performed can be determined.

In the management system, the management control device may compare and determine whether a total amount of the game token grasped in the game token tray corresponds to an increase or decrease according to an amount paid of the game token corresponding to the exchanged bill after the exchange between the bill and the game token and an increase or decrease of the game token calculated from an amount of the game token betted by all players and a victory or defeat result of the game.

With this configuration, when the exchange between the bill and the game token is performed, whether the settlement of the game is correctly performed can be determined.

In the management system, the management control device may be an artificial intelligence utilizing type or a deep learning structure that can obtain information about the type and the number of the game token even if a part or a whole is hidden due to a blind angle of the camera in measuring and determining the type and the number of the game token.

With this configuration, the number and the type of the game token randomly placed on the game table can be recognized based on the image of the camera.

In the management system, the side code may be attached to at least three points spaced apart in a rotational direction in the light color layer of the side surface of the game token, the type and manufacturing information of the game token may be specified by reading the side code using the camera, and the specified information and a predetermined database may be collated and managed.

With this configuration, the fraud game token can be detected by collating contents of the side code indicating the type and the manufacturing information with the database.

The management system may further include a camera that images and records the game token on the game table.

The camera may be configured to image the game token using a single camera or a plurality of cameras having different heights arranged at predetermined positions.

With this configuration, the game token at various positions on the game table can be imaged at various angles.

According to an aspect of the present invention, a game token tray provided on a game table and holding a game token, includes: an upper tray used to take in and out the game token during settlement of a game; and a lower tray disposed below the upper tray and storing the game token for replenishment to the upper tray. The game token includes a plastic layer, a specific color capable of specifying a type of the game token is at least partially provided in the game token, a printing layer representing the type of the game token is provided in upper and lower surfaces of the game token, the game token has a structure in which an RF tag representing a value can be fixed to the plastic layer, the value being able to be individually specified by the specific color, an upper portion of the upper tray is open such that the game token placed on the upper tray can be imaged by a camera, and the RF tag of each game token placed on the lower tray can be read by an RFID reading device, the upper tray and the lower tray can take two modes of a state in which the upper tray and the lower tray are overlapped and an open state in which the game token on the lower tray can be taken in and out, and the RFID reading device does not read the RFID of the game token placed on the upper tray while the upper tray and the lower tray are overlapped.

With the above configuration, for the upper tray used to take in and out the game token during the settlement of the game, the position and movement of the game token can be recognized to detect the fraud by performing the imaging with the camera. For the lower tray in which the game token for replenishment is stored, the RF tag can be read even if the upper tray is stacked, and the RF tag is not read for the game token of the upper tray. Thus, the game token stored in the lower tray can be grasped by reading the RF tag. As described above, because the game token of the upper tray and the game token of the lower tray can be grasped, the movement of the game token between the upper tray and the lower tray can also be grasped, and the fraud can be detected in the movement of the game token. As to the upper tray, the game token in which the RF tag is broken or the game token that does not include the RF tag can also be detected.

In the game token tray, a number of the game tokens at each position in the upper tray may be specified by specifying the value of the game token.

With this configuration, the number of game tokens located in the upper tray, a value of the game tokens, and a location of the game tokens can be specified.

According to an aspect of the present invention, a management system for a table game that uses a game table, includes: a game token including a plastic layer, a specific color capable of specifying a type of the game token being at least partially provided in the game token, a printing layer representing the type of the game token being provided in upper and lower surfaces of the game token, a value of the game token capable to being individually specified by the specific color, an RF tag representing the type being fixed to the plastic layer; a game token tray provided on the game table and holding the game token; a camera that images the game token placed on the game token tray; an RFID reading device that reads the RF tag of each game token placed on the game token tray; and a management control device that specifies and stores the value and a number of the game token on the game token tray using an imaging result of the camera and a reading result of the RFID reading device. The game token tray includes an upper tray used to take in and out the game token during settlement of a game and a lower tray disposed below the upper tray and storing the game token for replenishment to the upper tray, the upper tray and the lower tray can take two modes of a state in which the upper tray and the lower tray are overlapped and an open state in which the game token on the lower tray can be taken in and out, and an upper portion of the upper tray is open such that the game token placed on the upper tray can be imaged by the camera, and an RFID of each game token placed on the lower tray can be read by the RFID reading device.

With this configuration, for the upper tray used to take in and out the game token during the settlement of the game, the position and movement of the game token can be recognized to detect the fraud by performing the imaging with the camera. For the lower tray in which the game token for replenishment is stored, the RF tag can be read even if the upper tray is stacked. Thus, the game token stored in the lower tray can be grasped by reading the RF tag. As to the upper tray, the game token in which the RF tag is broken or the game token that does not include the RF tag can also be detected.

In the management system, the management control device may specify the value and a position of each game token in the upper tray using the camera.

With this configuration, a value of game tokens located in the upper tray, and a location of the game tokens can be specified.

In the management system, the management control device may determine whether the game token in the upper tray is a predetermined game token using the camera.

With this configuration, the fraud game token can be determined.

According to an aspect of the present invention, a game token tray system includes: a double tray including a lower tray and an upper tray stacked on the lower tray to store a game token provided with an RF tag in which tag information is stored; image acquisition means for acquiring tray image data by imaging the game token stored in the upper tray; RFID reading means for reading the tag information from the RF tag of the game token stored in the lower tray; and recording means for recording the tray image data and/or an image analysis result of the tray image data about the game token stored in the upper tray, and recording the tag information read by the RFID reading means about the game token stored in the lower tray.

With this configuration, as to the upper tray, the position and the movement of the game token can be recognized to detect the fraud by acquiring the tray image data, and as to the lower tray, even if the upper tray is overlapped, the stored game token can be grasped by reading the RF tag. As to the upper tray, the game token in which the RF tag is broken or the game token that does not include the RF tag can also be detected.

In the game token tray system, the image acquisition means may be configured not to image the game token stored in the lower tray is not imaged by the image acquisition means, the RFID reading means may be configured not to read the tag information about the game token stored in the upper tray, and the recording means may not record the tag information about the game token stored in the upper tray, and may not record either the tray image data of the game token stored in the lower tray or the image analysis result of the tray image data.

With this configuration, because the RF tag is not read for the game token of the upper tray, the game token of the upper tray and the game token of the lower tray can be grasped, and the movement of the game token between the upper tray and the lower tray can also be grasped.

In the game token tray system, the lower tray may be installed at a position where the game token stored in the lower tray is not imaged by the image acquisition means, the RFID reading means is configured not to read the tag information about the game token stored in the upper tray, and the recording means may not record the tag information about the game token stored in the upper tray, and may not record either the tray image data of the game token stored in the lower tray or the image analysis result of the tray image data.

With this configuration, because the RF tag is not read for the game token of the upper tray, the game token of the upper tray and the game token of the lower tray can be grasped, and the movement of the game token between the upper tray and the lower tray can also be grasped.

The game token tray system may further include image analysis means for specifying the position of the game token stored in the upper tray based on the tray image data. The recording means may record information about the position of the game token as the image analysis result.

With this configuration, the position of the game token in the upper tray can be specified and recorded.

The game token tray system may further include image analysis means for specifying a value indicated by a color of the side surface of the game token stored in the upper tray based on the tray image data. The color indicating the value of the game token may be given to the side surface of the game token, and the recording means may record information about the value specified by the image analysis means as the image analysis result.

With this configuration, a value of the game token located in the upper tray can be specified and recorded by the color of the side surface of the game token.

The game token tray system may further include image analysis means for specifying identification information about the game token stored in the upper tray based on the tray image data. The identification information about the game token may be written in the side surface of the game token, and the recording means may record the identification information specified by the image analysis means as the image analysis result.

With this configuration, which game token is located in the upper tray can be identified and recorded by the identification information written in the side surface of the game token.

The game token tray system may further include a database in which the identification information is recorded.

With this configuration, the fraud game token can be detected by collating the identification information written in the side surface with the database.

In the game token tray system, the image analysis means may perform image recognition based on machine learning on the tray image data.

With this configuration, the analysis of the tray image data can accurately be performed.

The game token tray system may further include fraud detecting means for detecting fraud based on the image analysis result.

With this configuration, the fraud can be detected based on the image analysis result.

The game token tray system may further include fraud detecting means for detecting fraud based on the image analysis result and the tag information read from the RF tag.

With this configuration, the fraud can be detected based on the image analysis result and the read tag information.

According to an aspect of the present invention, a game token tray system includes: a double tray including a lower tray and an upper tray stacked on the lower tray to store a game token provided with an RF tag in which tag information is stored; image acquisition means for acquiring tray image data by imaging the game token stored in the upper tray; RFID reading means for reading the tag information from the RF tag of the game token stored in the lower tray; and fraud detecting means for detecting fraud about the upper tray based on the tray image data, and detecting fraud about the lower tray based on tag information read by the RFID reading means.

With this configuration, as to the upper tray, the fraud can be detected based on the tray image data, and as to the lower tray, the RF tag can be read even if the upper tray is overlapped, so that the game token stored in the lower tray can be grasped by reading the tag information. As to the upper tray, the game token in which the RF tag is broken or the game token that does not include the RF tag can also be detected.

The game token tray system may further include image analysis means for specifying a value indicated by a color of the side surface of the game token stored in the upper tray based on the tray image data. The color indicating the value of the game token may be given to the side surface of the game token, information indicating the value of the game token may be stored as the tag information in the RF tag, and the fraud detecting means may detect the fraud by determining whether the value increased or decreased in the upper tray corresponds to the value increased or decreased in the lower tray based on the value specified by the image analysis means and the value read by the RFID reading means when the game token is moved between the upper tray and the lower tray.

With this configuration, whether the game token is correctly moved between the upper tray and the lower tray can be determined.

The game token tray system may further include image analysis means for specifying a value indicated by a color of the side surface of the game token stored in the upper tray based on the tray image data. The color indicating the value of the game token may be given to the side surface of the game token, and the fraud detecting means may detect the fraud by determining whether an adjusted amount corresponds to the value increased or decreased in the upper tray before and after settlement based on the value specified by the image analysis means and the adjusted amount based on a game result and a bet amount of a player.

With this configuration, whether the settlement after the game is correctly performed can be determined.

The game token tray system may further include image analysis means for specifying identification information about the game token stored in the upper tray based on the tray image data. Identification information about the game token may be stored as the tag information in the RF tag of the game token, the identification information about the game token may be written in the side surface of the game token, and the fraud detecting means may detect the fraud by determining whether the identification information read by the RFID reading means corresponds to the identification information specified based on the tray image data when the game token is moved between the upper tray and the lower tray.

With this configuration, using the identification information, the fraud can be detected during the movement of the game token between the upper tray and the lower tray.

The game token tray system may further include: image analysis means for specifying identification information about the game token stored in the upper tray based on the tray image data; and a database in which a plurality of pieces of the identification information are stored. The identification information about the game token may be written in the side surface of the game token, and the fraud detecting means may detect the fraud by determining whether the identification information specified by the image analysis means is stored in the database.

With this configuration, the game token in which the identification information stored in the database is not written can be detected as the fraud game token.

In the game token tray system, the fraud detecting means may specify a position of the fraud game token in which the identification information specified by the image analysis means is not stored in the database.

With this configuration, the position of the fraud game token can be specified.

In the game token tray system, the double tray may be installed on a game table, the image acquisition means further acquires a table image data by imaging a table surface of the game table, and the fraud detecting means may specify a location, from which the fraud game token is collected, on the table surface based on the position of the fraud game token and the table image data.

With this configuration, a location from which (the player or the position of the player) the fraud game token comes can be specified.

In the game token tray system, the double tray may be installed on a game table, information indicating the value of the game token may be written in the side surface of the game token, the image acquisition means may acquire table image data by imaging a table surface of the game table, the game token tray system may further include image analysis means for specifying an amount of a bill exchanged for the game token based on the table image data, and specifying a value based on an image of the side surface of the game token stored in the upper tray, and the fraud detecting means may determine whether the amount of the bill specified by the table image analysis means corresponds to the value of the game token exchanged for the bill.

According to this configuration, whether the exchange is correctly and equivalently performed can be determined when the bill and the game token are exchanged on the game table.

According to an aspect of the present invention, a game token tray system includes: a double tray including a lower tray and an upper tray stacked on the lower tray to store a game token provided with an RF tag in which tag information is stored; tray image acquisition means for acquiring tray image data by imaging the game token stored in the upper tray; and RFID reading means for reading the tag information from the RF tag of the game token stored in the lower tray, and not reading the tag information from the RF tag of the game token stored in the upper tray.

With this configuration, the tray image data can be acquired for the game token in the upper tray, the RF tag is read for the game token in the lower tray, and the RF tag is not read for the game token in the upper tray, so that the game token stored in the lower tray can be grasped by reading the RF tag.

According to an aspect of the present invention, a game token tray system comprising: a double tray including a lower tray and an upper tray stacked on the lower tray to store a game token provided with an RF tag in which tag information is stored; RFID reading means for reading the tag information from the RF tag of the game token stored in the lower tray, and not reading the tag information from the RF tag of the game token stored in the upper tray; and fraud detecting means for detecting fraud movement of the game token based on the tag information read by the RFID reading means when the game token is moved between the upper tray and the lower tray.

With this configuration, the tray image data can be acquired for the game token of the upper tray, and the RF tag is read for the game token of the lower tray, so that the movement of the game token between the upper tray and the lower tray can be grasped, and the fraud such as pilfering of the game token in the movement can be detected.

According to an aspect of the present invention, a game token management method in a double tray including a lower tray and an upper tray stacked on the lower tray to store a game token provided with an RF tag in which tag information is stored, includes: a tray image acquisition step of acquiring tray image data by imaging the game token stored in the upper tray; an image analysis step of analyzing the game token stored in the upper tray by performing image analysis on the tray image data; a reading step of reading the tag information from the RF tag of the game token stored in the lower tray; and a fraud movement detecting step of detecting fraud movement of the game token by determining whether an increase or decrease of the game token in the upper tray based on the tray image data corresponds to an increase or decrease of the game token in the lower tray based on the tag information read in the reading step.

With this configuration, the tray image data can be acquired for the game token of the upper tray, and the RF tag is read for the game token of the lower tray, so that the movement of the game token between the upper tray and the lower tray can be grasped, and the fraud such as pilfering of the game token in the movement can be detected.

In the game token management method, the value of the game token may be written in the side surface of the game token, and in the image analysis step, image analysis may be performed on the tray image data to specify the value of the game token stored in the upper tray, the game token management method may further include: an adjusted amount calculation step of calculating an adjusted amount of the game token based on a game result and a bet amount of a player; and a fraud settlement detecting step of detecting fraud settlement by determining whether the adjusted amount calculated in the adjusted amount calculation step corresponds to a value increased or decreased in the upper tray.

With this configuration, whether the settlement is correctly performed can be determined.

In the game token management method, the image analysis may be the tray image analysis step is image recognition based on machine learning.

With this configuration, accuracy of the fraud detection can be improved.

Advantageous Effects of Invention

In the present invention, for the upper tray used to take in and out the game token during the settlement of the game, the position and movement of the game token can be recognized to detect the fraud by performing the imaging with the camera. For the lower tray in which the game token for replenishment is stored, the RF tag can be read even if the upper tray is stacked, and the RF tag is not read for the game token of the upper tray. Thus, the game token stored in the lower tray can be grasped by reading the RF tag. As described above, because the game token of the upper tray and the game token of the lower tray can be grasped, the movement of the game token between the upper tray and the lower tray can also be grasped, and the fraud can be detected in the movement of the game token. As to the upper tray, the game token in which the RF tag is broken or the game token that does not include the RF tag can also be detected.

DESCRIPTION OF EMBODIMENTS

Hereinafter, an embodiment of the present invention will be described with reference to the drawings. The following embodiment illustrates an example in the case of implementing the present invention, and the present invention is not limited to the specific configuration described below. In the implementation of the present invention, a specific configuration according to the embodiment may appropriately be adopted.

A game token tray system and a table game management system in a game arcade including a plurality of game tables according to a first embodiment of the present invention will be described below. The management system of the embodiment includes a game table and a game token tray system, and the game token system of the embodiment includes a game token, a game token tray, a camera, an RFID reader, and a management control device.

Figure 1:
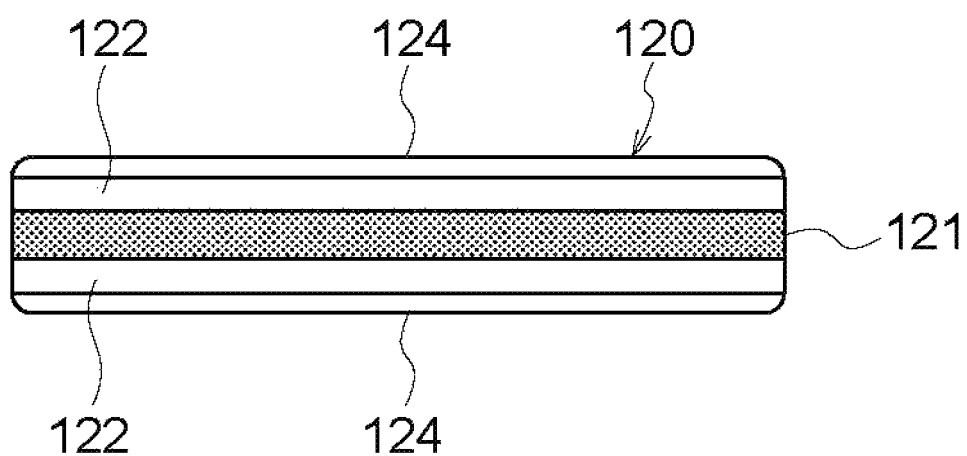
FIG. 1 is a side view of a game token in an embodiment of the present invention.
Figure 2:
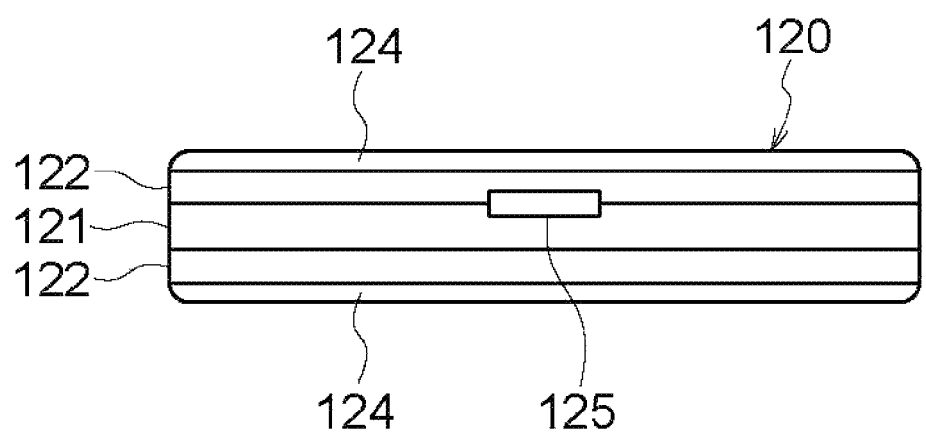
FIG. 2 is a sectional view of the game token in the embodiment of the present invention.

The game token used in the management system or the game token tray system of the embodiment will be described first. FIG. 1 is a side view of the game token of the embodiment, and FIG. 2 is a sectional view of the game token of the embodiment. As illustrated in FIG. 1, a game token 120 is formed by laminating a plurality of plastic layers having different colors. The game token 120 has a layer of a specific color (specific color layer) 121 at least in the middle and has a multi-layer structure in which a layer of a light color (light color layer) 122 is laminated on both sides of the specific color 121 in the middle. The color of the light color layer 122 may be lighter than the specific color (when lightness is high), and includes white.

In manufacturing the game token 120, a plurality of plastic plate members are laminated and thermocompression-bonded, and punching is performed to obtain a plurality of game tokens 120. Specifically, a light color plastic plate constituting the lower light color layer 122, a specific color plastic plate constituting the specific color layer 122, and a plastic plate constituting the upper light color layer 122 are laminated in this order to form a laminated structure constructed with a plurality of plastic layers. At this point, an RF tag (also referred to as an RF chip or a noncontact tag) 125 that is a wireless tag is embedded in a substantial center of each punching for obtaining a plurality of game tokens 120. Specifically, the RF tag 125 is placed between the specific color layer 121 and the upper light color layer 122.

A pattern corresponding to each game token 120 is printed on a top surface and a bottom surface of the laminated structure, and a transparent layer 124 is further provided on the pattern. The laminated structure and the transparent layer 124 are heated and pressed to heat-weld each layer, thereby preparing a taken original plate. At this point, in a portion overlapping the RF tag 125, the plastic plate is deformed according to the RF tag 125 by heat (although the RF tag 125 is drawn thicker than the actual RF tag 125 in FIG. 2, the actual RF tag 125 is thinner than the RF tag 125 drawn in FIG. 2), so that the top and bottom surfaces of the game token 120 after each device is thermocompression-bonded are formed flat without being raised by the RF tag 125.

The game token original plate made in this way is punched out using a die to obtain a plurality of game tokens 120 having a predetermined shape. In the punching, upper and lower corners of the outer side of the game token 120 are rounded using a die.

As illustrated in FIG. 2, a striped pattern in which the specific color layer 121 is sandwiched between the light color layers 122 in the laminating direction of the side surface is formed by making the game token 120 having a multilayer structure in which the specific color layer 121 and the light color layer 122 are laminated. At this point, the specific color may be a color different for each type of the game token 120 (that is, value: 10 points, 20 points, 100 points, 1000 points, and the like). For example, 10 points may be set to red, 20 points may be set to green, 100 points may be set to yellow, and 1000 points may be set to blue. The color of the light color layer 122 is commonly used for each type of the game token 120. That is, the color of the light color layer 122 is identical in any type of the game token 120.

Thus, the game token 120 has the specific color layer 121 and the light color layer 122 at least in appearance so as to form a stripe pattern in an axial direction (thickness direction) on the side surface, and the type of the game token 120 can be specified by the color of the specific color layer 121. Thus, even if the plurality of game tokens 120 are stacked, the type of the game token 120 can be determined by the color of the specific color layer 121 sandwiched between the light color layers 122 by observing the side surface of the game token 120.

At least identification information uniquely specifying the game token 120, a type (value) of the game token 120, a date of manufacture, and the like are stored as tag information in the RF tag 125. In the regular game token 120, the type (value) stored in the RF tag 125 as the tag information is matched with the type (value) represented by the specific color layer 121 of the side surface.

Figure 3:
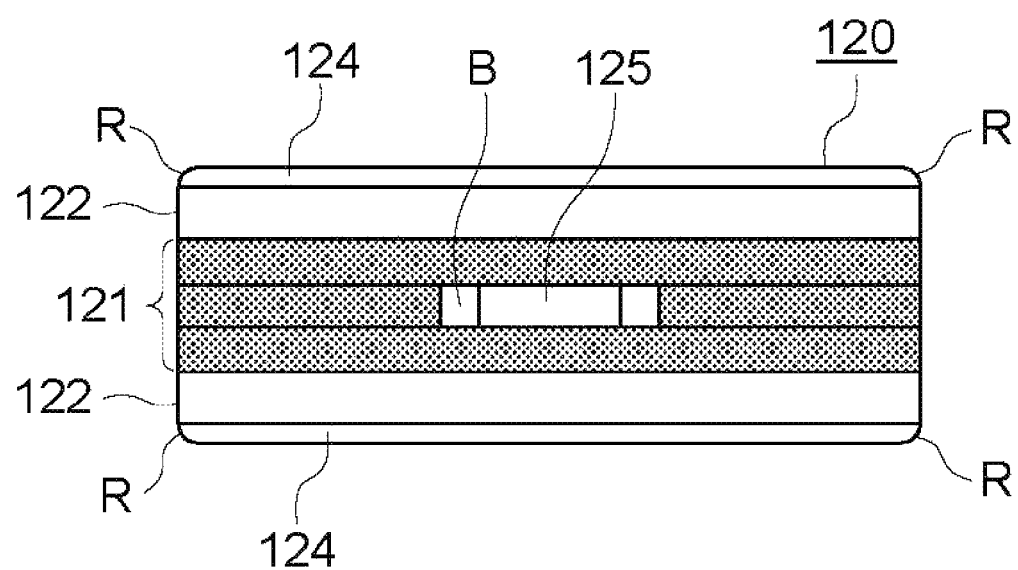
FIG. 3 is a sectional view of another example of the game token in the embodiment of the present invention.
Figure 4:
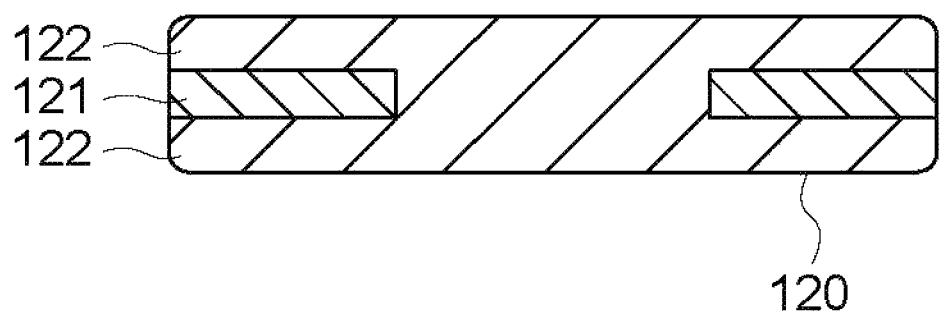
FIG. 4 is a sectional view of another embodiment of the game token in the embodiment of the present invention.
Figure 5:
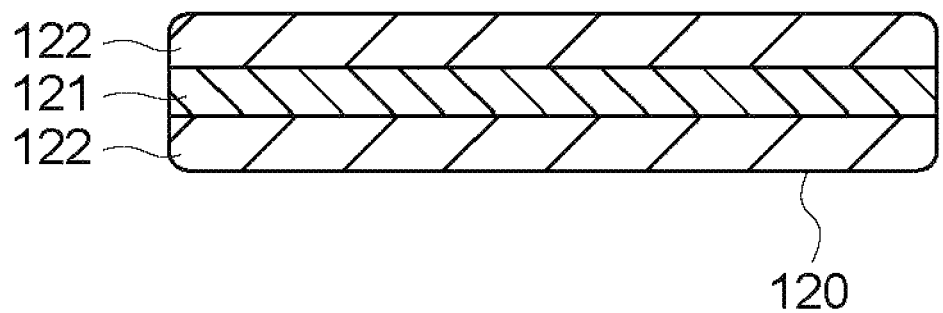
FIG. 5 is a sectional view of another example of the game token in the embodiment of the present invention.

FIGS. 3 to 5 are sectional views illustrating another example of the game token. In FIG. 3, the specific color layer 121 is constructed with three layers. A hole B is made in a middle layer of the specific color layer 121 in order to store the RF tag 125 in a central portion of the middle layer, and a cavity is formed in order to the RF tag 125 by sandwiching the hole B between the upper layer and the lower layer of the specific color layer 121.

FIG. 4 illustrates an example in which the specific color portion 121 and the white portion 122 are formed by injection molding. Specifically, the specific color portion 121 and the light color portion 122 are formed by what is called two-color molding in which the specific color portion 121 is molded first using a specific color resin in a molding die (not illustrated), and then the light color portion 122 is molded using a light color resin.

FIG. 5 illustrates an example in which a specific color layer sandwiched between light color layers is constructed by printing the specific color in the center of the side surface after forming the game token 120 using a light color resin or a plastic material. In this case, the RF tag 125 is embedded between two light plastic plates, the transparent layer 124 is overlapped after printing on the top surface and the bottom surface, thereby forming the laminate. After thermocompression bonding and punching, the side surface of the game token 120 may be colored in a specific color.

Figure 6:
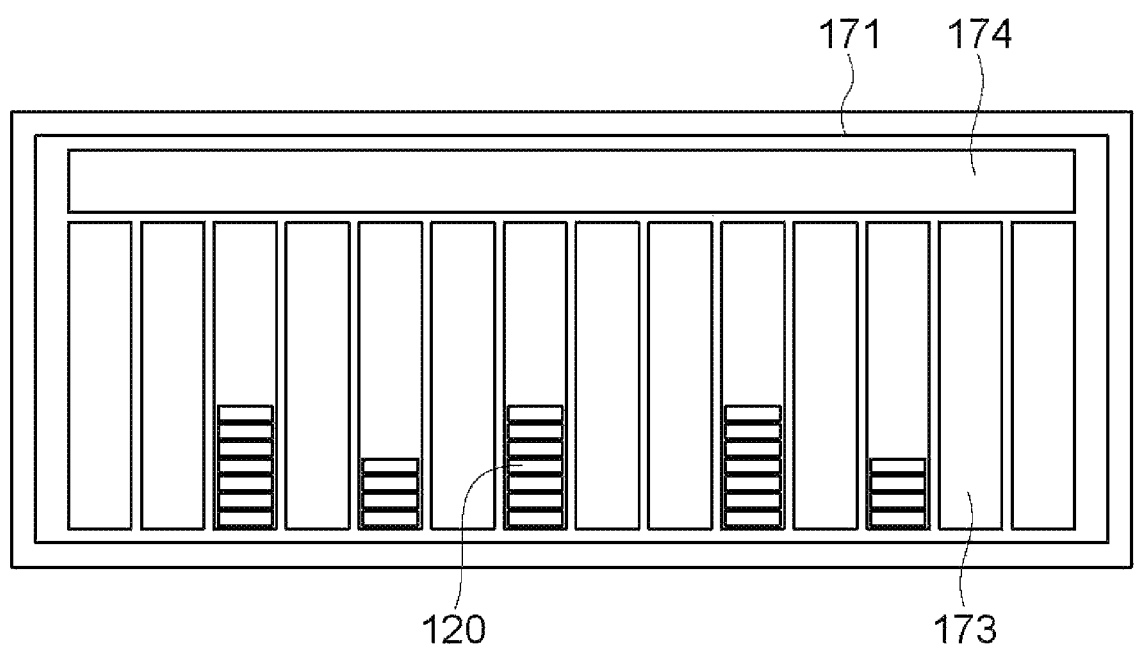
FIG. 6 is a plan view of the game token tray in the embodiment of the present invention.
Figure 7:
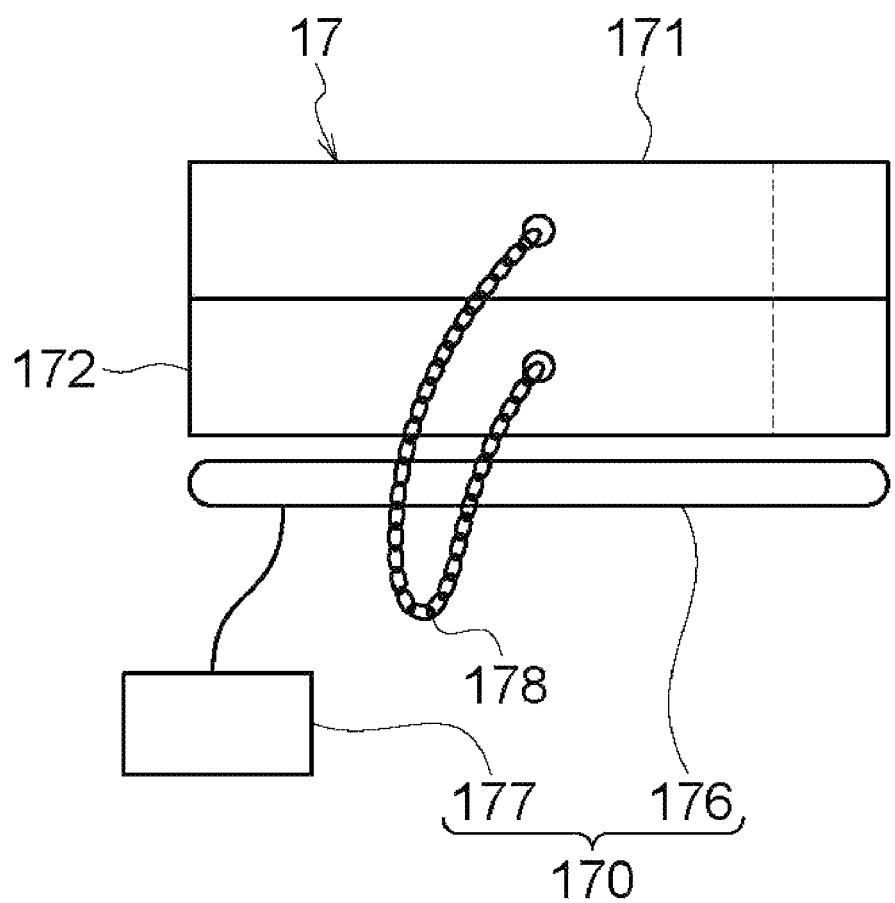
FIG. 7 is a side view of the game token tray in the embodiment of the present invention.

The game token tray will be described below. FIG. 6 is a plan view of the game token tray, and FIG. 7 is a side view of the game token tray. The game token tray 17 of the embodiment has a double tray structure including an upper tray 171 and a lower tray 172. The game token tray 17 holds the game token 120 in each of the upper tray 171 and the lower tray 172. As illustrated in FIG. 7, the upper tray 171 is used while stacked on the lower tray 172.

The lower tray 172 is disposed below the upper tray 171, and stores the game token 120 for replenishing the upper tray 171. The lower tray 172 is also used to store the game token 120 that is no longer stored in the upper tray 171. During the game, the upper tray 171 is stacked on the lower tray 172, and is used to put in and out the game token 120 when the game is adjusted. For this purpose, the upper tray 171 is open at the top surface. The top surface of the lower tray 172 is also opened by removing the upper tray 171 from above, and the game token 120 can be taken in and out.

As illustrated in FIG. 6, the upper tray 171 includes a plurality of rows of vertical orientation storage units 173 and a row of sideways storage unit 174 on the plurality of vertical orientation storage units 173. During the settlement, the game token 120 is paid out from the vertical orientation storage unit 173 to the player, and the game token 120 collected from the player is temporarily stored in the sideways storage unit 174. The lower tray 172 includes a plurality of rows of vertical orientation storage units 175.

An antenna 176 is installed below the lower tray 172 in order to read the RF tag 125 of the game token 120 stored in the lower tray 172. The antenna 176 is connected to a reader 177, and the antenna 176 and the reader 177 constitute an RFID reading device 170. The antenna 176 is controlled by the reader 177 to generate a radio wave. The RF tag 125 of the game token 120 stored in the lower tray 172 receives the radio wave, generates power by rectification, and transmits information (tag information) stored in the RF tag 125 on the radio wave. The antenna 176 receives the radio wave, and the reader 177 reads the tag information about the RF tag 125 stored in the RF tag 125 from the radio wave.

At this point, the RFID reading device 170 including the antenna 176 and the reader 177 is configured such that the radio wave can reach only the RF tag 125 of the game token 120 in the lower tray 172, and therefore the tag information is read from the RF tag 125 of the game token 120 stored in the lower tray 172, but the tag information is not read from the RF tag 125 of the game token 120 stored in the upper tray 171. This configuration can be achieved by adjusting a frequency and intensity of the radio wave transmitted from the antenna 176, a material for the lower tray 172 and the upper tray 171, and a position of the antenna 176. The RFID reading device 170 may read the tag information about the RF tag 125 by electromagnetic induction.

Figure 8:
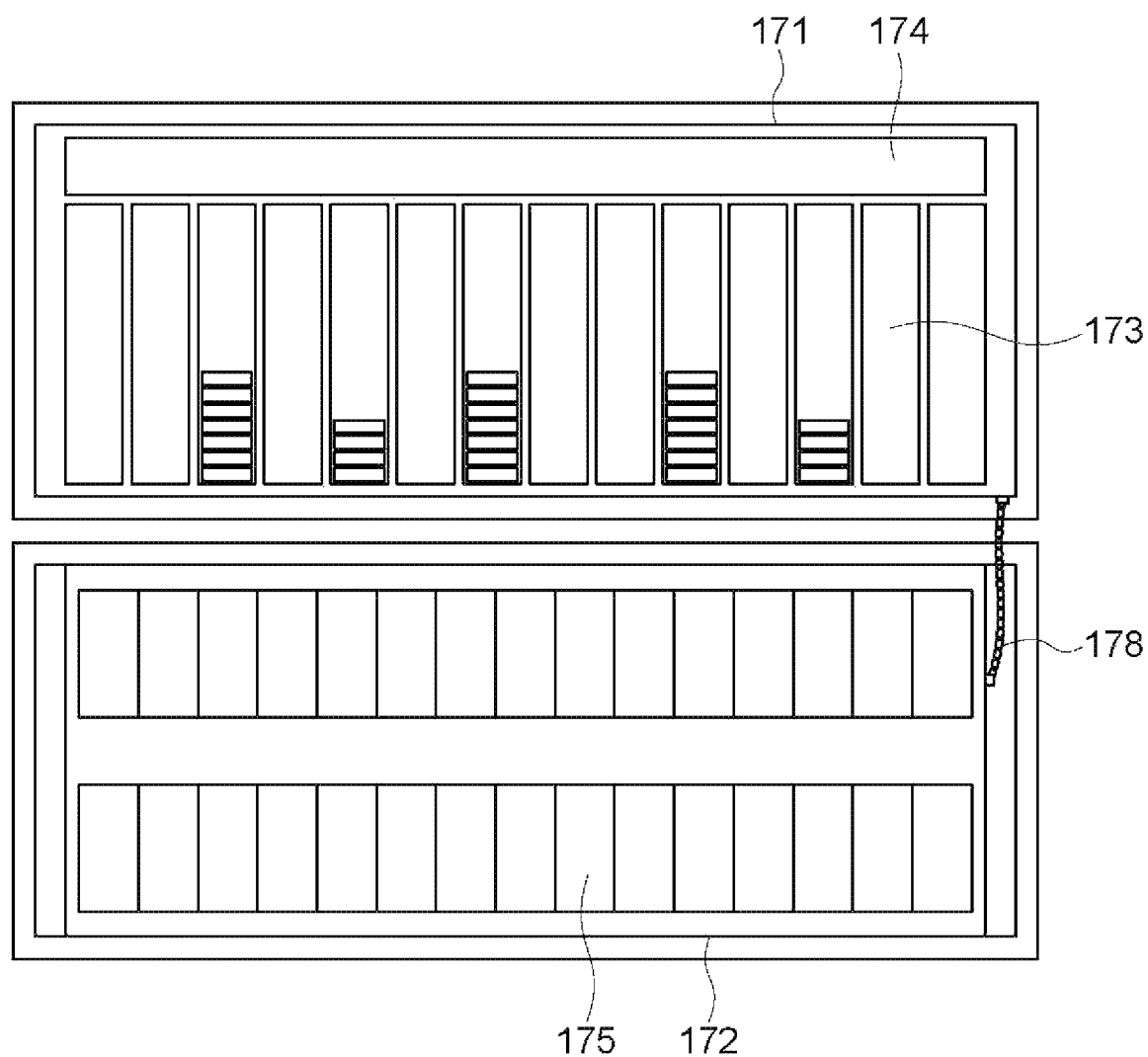
FIG. 8 is a plan view illustrating a state in which an upper tray in the embodiment of the present invention is removed.

FIG. 8 is a plan view illustrating a state (open state) in which the upper tray 171 is removed. When the upper tray 171 is removed, the top surface of the lower tray 172 is exposed, and the game token 120 can be taken in and out from the lower tray 172. The upper tray 171 and the lower tray 172 are connected to each other by a chain 178. Thus, the game token tray 17 constructed with the upper tray 171 and the lower tray 172 takes two modes of a state in which the upper tray 171 and the lower tray 172 are overlapped and an open state in which the game token 120 on the lower tray 172 can be taken in and out.

Figure 9:
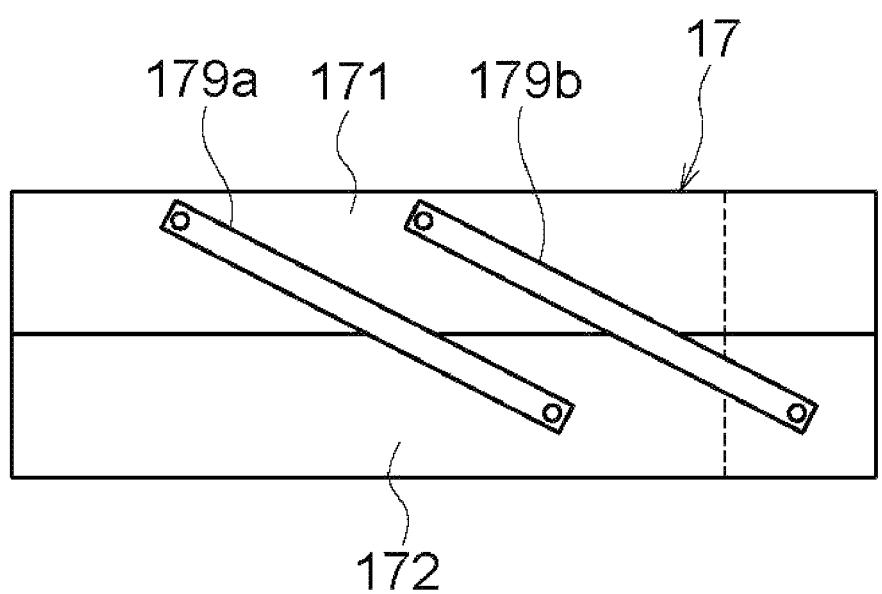
FIG. 9 is a side view illustrating another example of the game token tray in the embodiment of the present invention.
Figure 10:
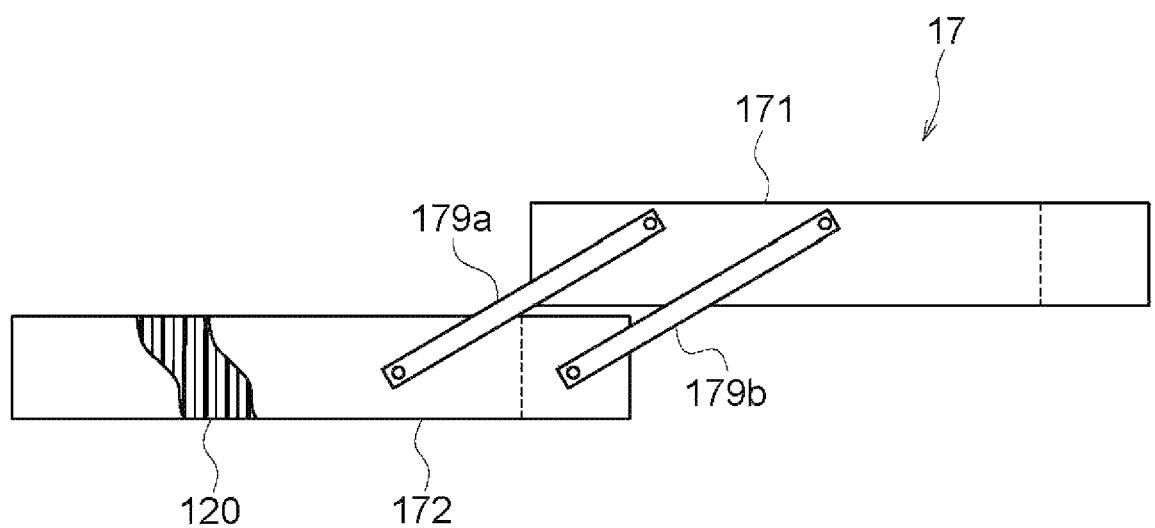
FIG. 10 is a side view illustrating another example of the game token tray in the embodiment of the present invention.

FIGS. 9 and 10 are side views illustrating another example of the game token tray 17. Even in the example of FIGS. 9 and 10, the game token tray 17 is configured as a double tray constructed with the upper tray 171 and the lower tray 172. However, in the example of FIGS. 9 and 10, the upper tray 171 and the lower tray 172 are connected to each other by links 179a, 179b having an equal length, and the upper tray 171 can be lifted obliquely upward while maintained in parallel to the lower tray 172 as illustrated in FIG. 10.

When the game token 120 is taken in and out from the lower tray 172, the upper tray 171 is moved by the links 179a, 179b and put in the state of FIG. 10. With this configuration, the top surface of the lower tray 172 can be opened while the game token 120 stored in the upper tray 171 is not spilled from the upper tray 171. In the state of FIG. 9, the upper tray 171 can be imaged with the camera 2.

Figure 11:
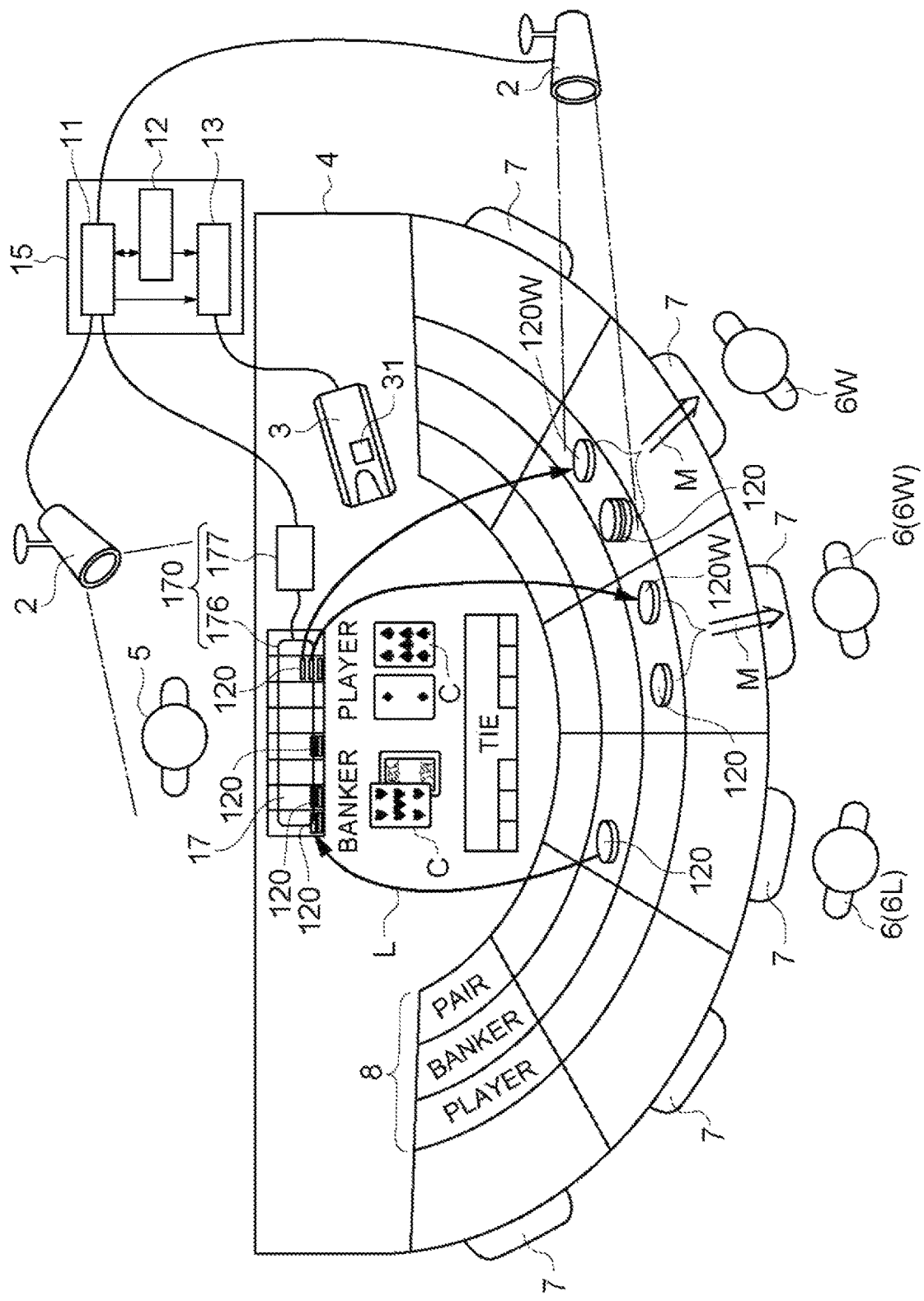
FIG. 11 is a view illustrating an outline of a whole management system in the embodiment of the present invention.

A management system for the game table including the game token 120 and the game token tray 17 will be described below. FIG. 11 is a view illustrating an outline of the whole management system of the embodiment. A management system 100 manages a table game at each game table in a game arcade having the plurality of game tables 4 using a management control device 15. The management system 100 is configured in each game table. Although the game table 4 and the management control device 15 are illustrated in FIG. 11, the management control device 15 may be shared by a plurality of game tables 4 in the game arcade.

One side (an upper side in FIG. 11) of the game table 4 has a linear shape, and an opposite side (a lower side in FIG. 11) is curved. A dealer 5 located at the straight side faces a plurality of players located at the curved side. A bet area 8 divided in each player is provided in front of each player of the game table 4, and the game token tray 17 is installed in front of the dealer 5. The game token tray 17 is embedded in the game table 4 such that the upper tray 171 is exposed to a table surface of the game table 4.

The management system 100 mainly includes a plurality of cameras 2 that image the table surface of the game table 4 (and the game token, hands, and the like on the table surface). Although the two cameras 2 are illustrated in FIG. 11, an example of the actual disposition of the cameras 2 is not limited to FIG. 11.

Figure 12:
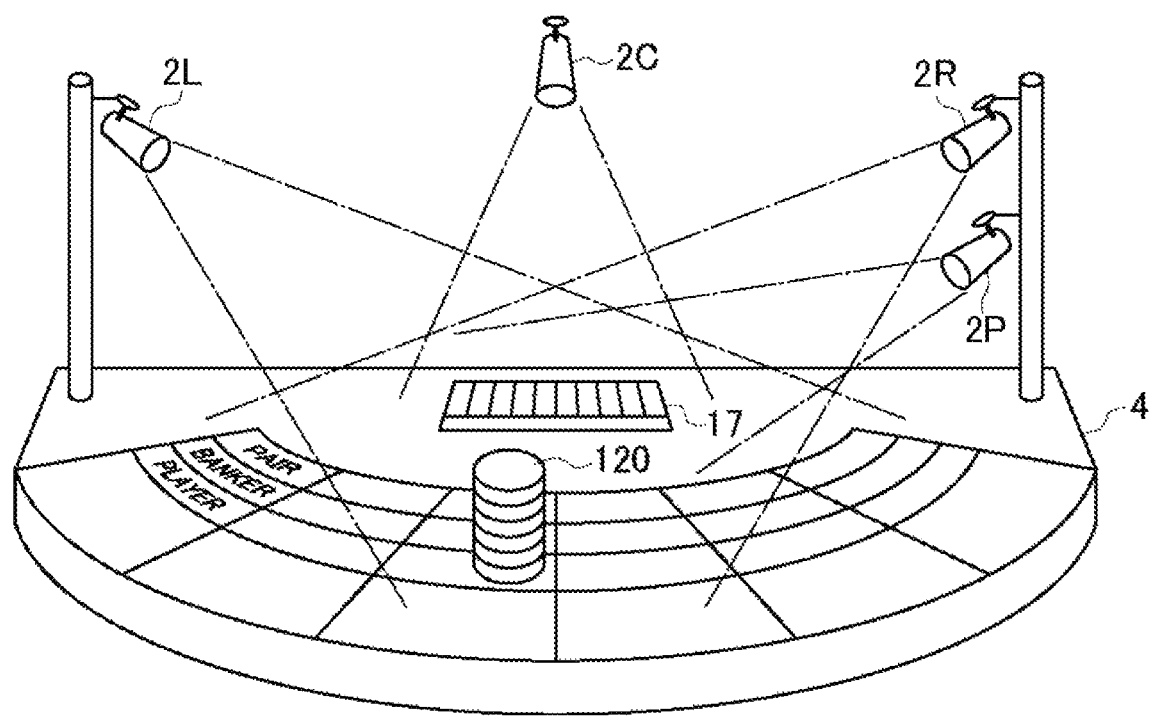
FIG. 12 is a view illustrating an example of disposition of a plurality of cameras in the management system in the embodiment of the present invention.

FIG. 12 is a view illustrating an example of the disposition of the plurality of cameras 2 in the management system 100. In the example of FIG. 12, the management system 100 includes a camera 2L that installed in the upper left of the game table 4 to mainly image a bet area on the right side of the game table 4, a camera 2R that is installed in the upper right of the game table 4 to mainly image the bet area on the left side of the game table 4, a camera 2C that mainly images the game token tray 17 from above, and a camera 2P that mainly images the game token tray 17 from obliquely above as the camera 2.

With this disposition, the plurality of cameras 2 image a progress state of the game played on the game table 4, and generate image data (video data or still image data). The plurality of cameras 2 also image operation of a player 6 or the dealer 5 on the card C or the game token 120. The plurality of cameras 2 correspond to the image acquisition means of the present invention.

Both the cameras 2C, 2P that image the game token tray 17 are installed to image the game token 120 stored in the upper tray 171. When the upper tray 171 is overlapped on the lower tray 172, the cameras 2C, 2P cannot image the lower tray 172. The camera 2P images the upper tray 171 obliquely from above, and the lower tray 172 is embedded in the game table 4. For this reason, the camera 2P cannot image the lower tray 172 even when the upper tray 171 is removed from the lower tray 172 to expose the top surface of the lower tray 172.

With reference to FIG. 11, a card distributing device 3 is placed on the game table 4. The card distributing device 3 has a configuration in which cards C used in the game can be stocked and drawn one by one as a card shoe. The card distributing device 3 is what is called an electronic shoe already used by those skilled in the art, and has a function of determining and displaying a victory or defeat result of each game.

That is, a game rule is previously programmed in the card distributing device 3. The card distributing device 3 reads the information about the distributed card C, and determines victory or defeat according to the game rule. For example, in a baccarat game, a banker's win, a player's win, and a tie (draw) are basically decided by a rank of 2 to 3 cards. The determination result (the victory or defeat result) is displayed on a result display lamp 31 of the card distributing device 3. The card distributing device 3 having this function constitutes a victory or defeat result determination device.

The game token tray 17 is embedded in the game table 4 while the upper tray 171 and the lower tray 172 are overlapped. The game token tray 17 is embedded in the center of the linear side of the game table 4 such that the upper tray 171 is exposed from the top surface of the game table 4, and is used by the dealer 5.

The management system 100 includes a management control device 15 as a device that controls management of the table game. The management control device 15 includes a game recording device 11, an image analysis device 12, and a fraud detecting device 13. The reader 177, the card distributing device 3, and the plurality of cameras 2 are connected to the management control device 15. The reader 177 may be incorporated in the management control device 15.

A general-purpose computer including a CPU, a memory, a storage device, various interfaces, and the like executes a management control program to implement the management control device 15. In the example of FIG. 11, the game recording device 11, the image analysis device 12, and the fraud detecting device 13 are integrated to constitute the management control device 15. Alternatively, a part or all of the game recording device 11, the image analysis device 12, and the fraud detecting device 13 may be distributed and disposed to constitute the management control system.

The game recording device 11 records image data imaged and generated by the plurality of cameras 2. The image data includes tray image data obtained by imaging the game token 120 stored in the upper tray 171 of the game token tray 17 with the cameras 2C, 2P and table image data obtained by imaging the bet area of the game table 4 with the cameras 2L, 2R. The game recording device 11 further records the tag information read by the reader 177 and the victory or defeat result determined by the card distributing device 3.

The image analysis device 12 performs image analysis on the image data recorded in the game recording device 11. Specifically, the image analysis device 12 detects the game token 120 from the image data by image recognition of machine learning. A convolutional neural network can be adopted as the machine learning, and in particular, detection accuracy can be improved by learning by the deep learning. Examples of detection targets of the image analysis device 12 include various types of the game tokens 120, various types of the cards C, various types of bills (bank notes), hands of the dealer 5 and the player 6. An image recognition engine in which learning is performed to recognize the detection targets is installed in the image analysis device 12.

The image analysis device 12 can perform image recognition that is robust against shielding, dirt, and deformation by performing matching using a local feature amount in the image recognition. Specifically, even if the game tokens 120 are randomly placed on the table so as to overlap with each other and a part of the game tokens 120 is shielded, the game tokens 120 can be recognized.

Figure 13:
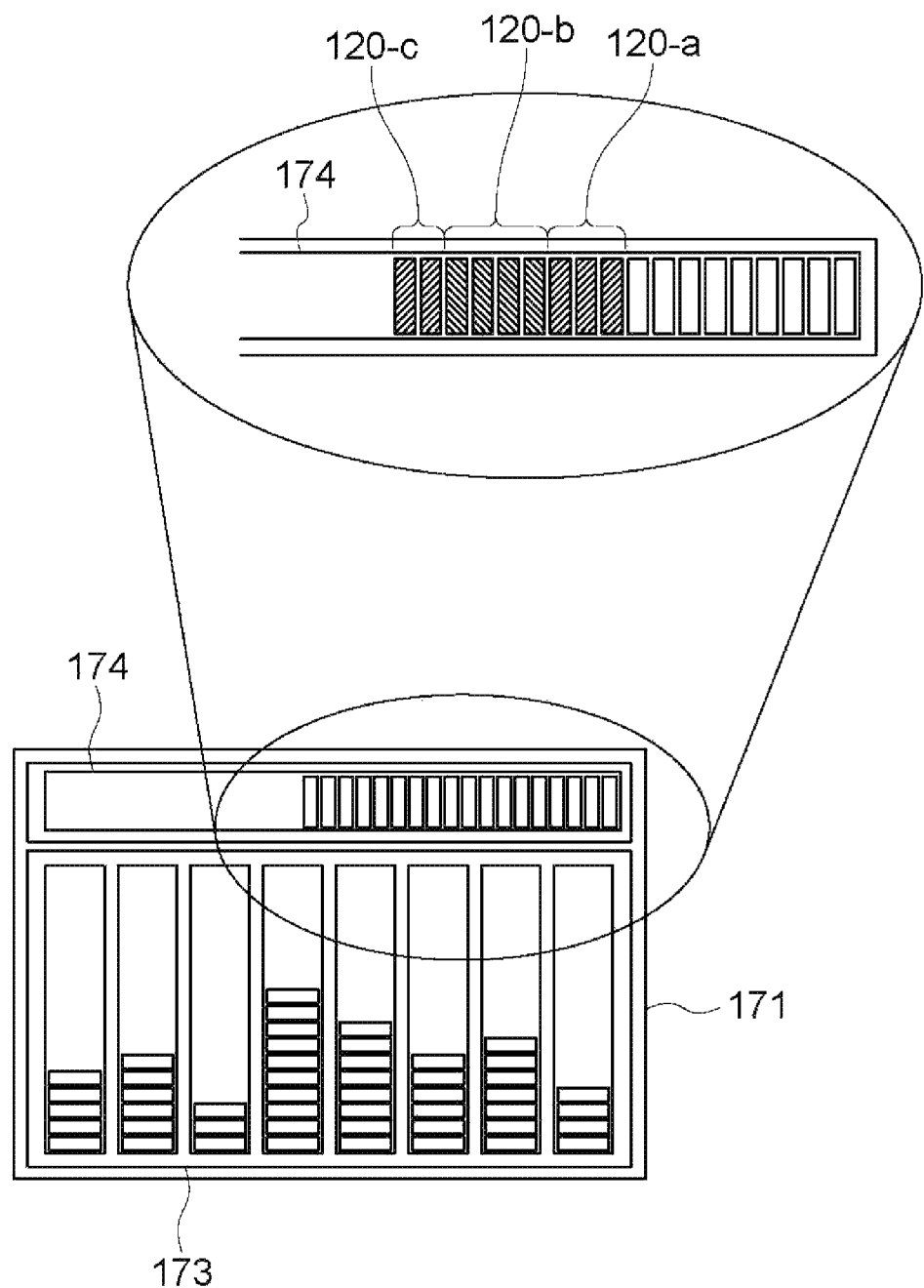
FIG. 13 is a view illustrating image analysis in an image analysis device in the embodiment of the present invention.

FIG. 13 is a view illustrating the image analysis in the image analysis device 12. The image analysis device 12 analyzes movement of dealer's hands, and analyzes which player whose game token 120 is collected with respect to the game token 120 collected from the player and stored in the sideways storage unit 174 of the upper tray 171. In the example of FIG. 13, a game token 120-a is collected from a player 6La, a game token 120-b is collected from a player 6Lb, and a game token 120-c is collected from a player 6Lc.

As a result of the image analysis, the image analysis device 12 outputs information about which player whose game token 120 is collected and the type and the position of the game tokens 120 in the upper tray 171 to the fraud detecting device 13, and records the information in the game recording device 11.

The fraud detecting device 13 detects the fraud using the analysis result of the image analysis device 12, the victory and defeat result of the game of the card distributing device 3, and the tag information about the RF tag 125 read by the RFID reading device 170 (the antenna 176 and the reader 177) and recorded in the game recording device 11. The fraud detecting device 13 may immediately perform the fraud detection when the analysis result, the victory and defeat result of the game, and the tag information are obtained. Alternatively, the tag information is temporarily recorded in the game recording device 11, and the fraud may be detected at subsequent predetermined timing or timing a user issues an instruction. The fraud detection will be described in detail below.

On the game table 4, the settlement is performed each time the game is over. That is, when the game is over, according to the victory and defeat result of the game, the dealer 5 collects the betted game token 120 from a player 6L who loses the game, and pays out the game token 120 corresponding to the bet amount to a player 6W who wins the game. The plurality of cameras 2 acquire the movement of the game token during the settlement, namely, the table image data and the tray image data before and after the settlement.

The image analysis device 12 performs the image recognition on the table image data in each game to grasp which position of a bet area 8 (for each player, one of player, banker, and pair) is betted the game token 120 by each player 6, the type (the game token 120 is assigned a value of a different amount for each color) of the game token 120 and the number of game tokens. The image analysis device 12 grasps the position, the type, and the number of the game token 120 stored in the upper tray 171 by performing the image recognition on the tray image data.

Figure 14:
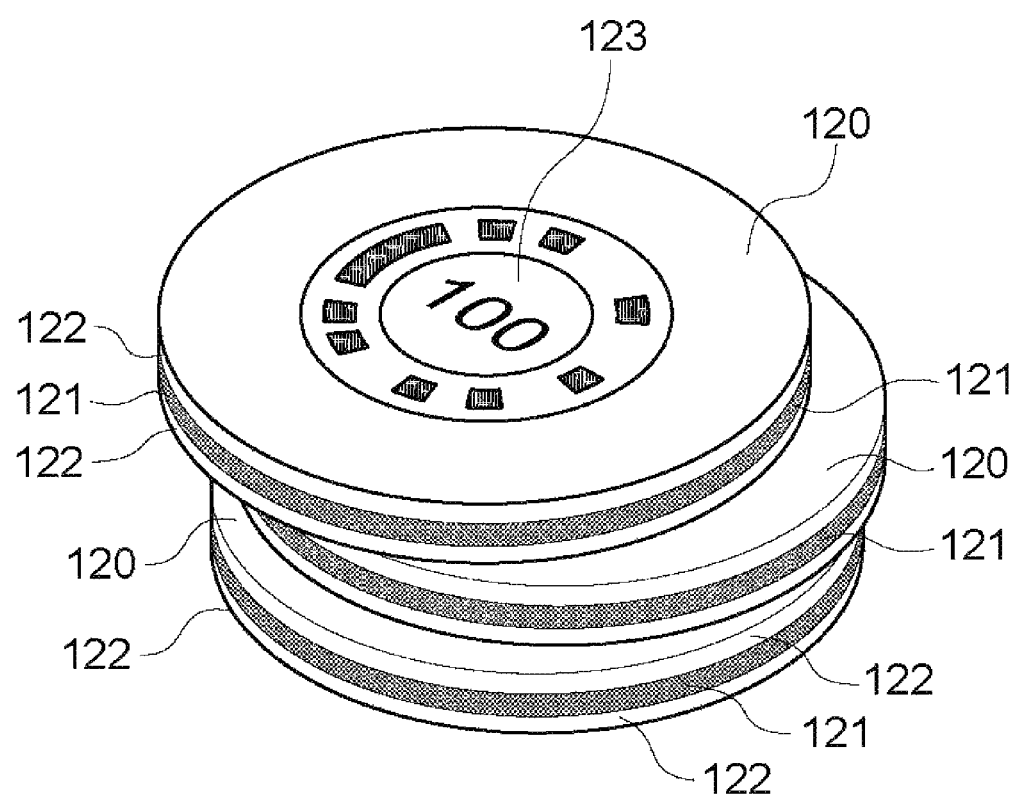
FIG. 14 is a perspective view of a plurality of game tokens stacked on a game table in the embodiment of the present invention.

FIG. 14 is a perspective view of the plurality of game tokens stacked on the game table 4. In the table image data, as illustrated in FIG. 14, the game token 120 is laminated, and a stripe pattern in a laminating direction is clearly formed in the side surface, so that the image analysis device 12 can easily grasp the type and the number of the game token 120. The image can correctly be analyzed and determined using an artificial intelligence utilizing type computer or control system and deep learning (structural) technique. Because the artificial intelligence utilizing type computer or control system and the deep learning (structural) technique are already known and available to those skilled in the art, the detailed description will be omitted.

Figure 15:
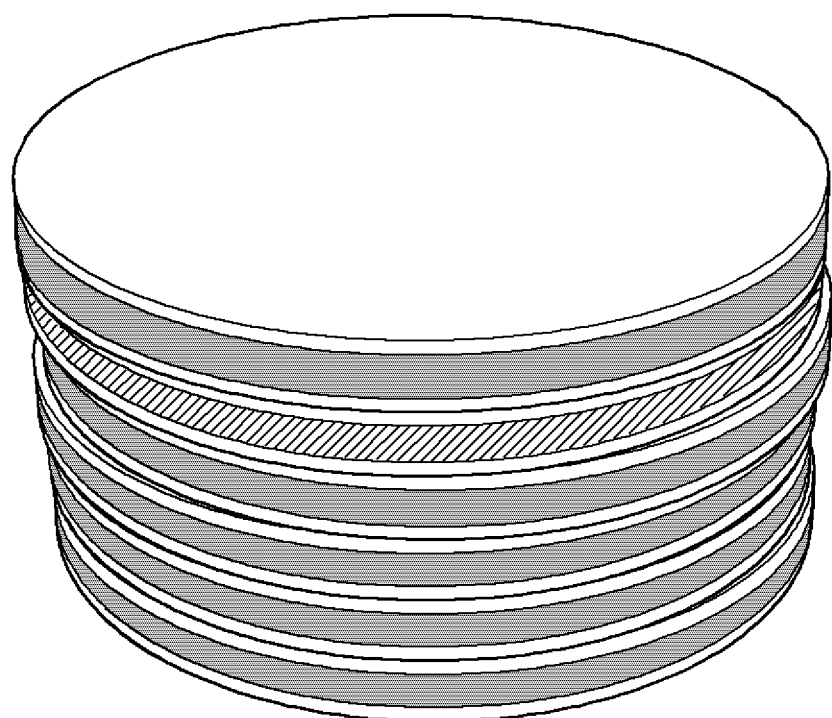
FIG. 15 is a perspective explanatory photograph illustrating a state in which different types of game tokens are stacked in the embodiment of the present invention.

FIG. 15 is a perspective explanatory photograph illustrating a state in which different types of game tokens 120 are stacked. The cameras 2L, 2R image the game token 120 placed on the game table 4 by the player 6, and the image analysis device 12 determines the placed area types (banker, player, pair, tie), and determines the number and the color of the specific color layer 121 of the game token 120 stacked in each area. The image analysis device 12 makes the above determination when the first card is drawn from the card distributing device 3, before and after the first card is drawn, or after the dealer 5 gives a bet end sign.

The fraud detecting device 13 calculates the settlement (collection payment) of the player 6 based on the game result (player, banker, tie) obtained from the card distributing device 3, the bet object (player, banker, pair) of each player 6 obtained by analyzing the table image data, and the bet amount. For this purpose, the fraud detecting device 13 grasps which position (player, banker, pair) of the bet area 8 is betted the game token 120 and the type (the game token 120 is assigned a value of a different amount for each color) and the number of the game token 120 from the image analysis result of the image analysis device 12, and determines whether the collection (indicated by an arrow L) of the game token of each player 6 who loses the game and the payment (120W) of the game token of the player 6W who wins the game are properly performed according to the victory and defeat result of the game determined by the card distributing device 3 in each game.

When the calculated adjusted amount is different from the actual adjusted amount grasped by the image analysis, the fraud detecting device 13 stores the image data in the game recording device 11. The stored image data can be verified later. As a result of the verification, when the intelligence type fraud detecting device 13 makes a mistake, the analysis image can be used as sample data of teacher learning in the deep learning technique, and used to improve the accuracy of the intelligence type fraud detecting device 13.

The fraud detecting device 13 obtains an increase or decrease amount of the game token 120 in the game token tray 17 before and after the settlement based on the analysis result of the tray image data in the image analysis device 12, and obtains an increase or decrease amount of the game token 120 in a vicinity of each bet area of the game table 4 before and after the settlement based on the analysis result of the table image data in the image analysis device 12. In the game token tray 17, in particular, as described above, the game token 120 collected from the game table 4 is stored in the sideways storage unit 174 of the upper tray 171, and the game token 120 is paid out from the vertical orientation storage unit 173 of the upper tray 171 to each player.

The fraud detecting device 13 compares the calculated adjusted amount to the increase or decrease amount in the game token tray 17 before and after the settlement, compares the calculated adjusted amount of each player to the increase or decrease amount in the bet area of each player on the game table 4, and determines whether the calculated adjusted amount is matched with the increase or decrease amount in the game token tray 17 and whether the calculated adjusted amount of each player is matched with the increase or decrease amount in the bet area of each player on the game table 4. That is, the fraud detecting device 13 determines whether the game token 120 of the calculated payment amount is paid to the player 6W whom the game token 120 should be paid (who wins the game), and determines whether the game token 120 of the calculated collection amount is collected from the player 6L whom the game token 120 should be collected (who loses the game). When the calculated adjusted amount (payment amount, collection amount) is matched with the increase or decrease amount of the game token 120 analyzed by the image analysis device 12, the fraud detecting device 13 determines that the settlement is normally performed (the fraud is not performed).

When the calculated adjusted amount (payout amount, collection amount) is not matched with the increase or decrease amount of the game token 120 analyzed by the image analysis device 12, the fraud detecting device 13 determines that the fraud settlement is performed.

The image analysis device 12 can specify the types of all the game tokens 120 stored in the upper tray 171 of the game token tray 17 of the game table 4 by analyzing the tray image data. The fraud detecting device 13 calculates the total amount of all the game tokens 120 stored in the upper tray 171 based on the analysis result. After the game is ended to perform the settlement according to the victory and defeat result of the game, the fraud detecting device 13 calculates how much the total amount of the game token 120 in the upper tray 171 should be increased or decreased according to the collection of a game token 120L of the player 6L who loses the game and the amount of a game token 120W to be paid to the player 6W who wins the game.

Although the total amount of the game token 120 in the upper tray 17 fluctuates in each game and is always grasped by the tray image data, the fraud detecting device 13 determines whether the increase or decrease amount is correct based on the analysis result of the table image data by the image analysis device 12, the victory and defeat result of the game by the card distributing device 3, and the analysis result of the tray image data by the image analysis device 12. The artificial intelligence utilizing type or the deep learning structure is also used for this function of the fraud detecting device 13.

The fraud detecting device 13 detects the fraud or the mistake based on the victory and defeat result of the game, information about what type of and how many game token 120 is betted on which position (player, banker, pair) in the bet area 8, and the increase or decrease amount of the game token 120 in the upper tray 171 after the collection of the game token 120 from the player who loses the game and the payment of the game token 120 to the player who wins the game, so that the fraud or the mistake can be detected without grasping the movement of the game token 120 after the game, namely, whether the betted game token 120 is moved to the player side or the dealer side.

At this point, for example, for baccarat, the victory or defeat result of the game can be determined according to a baccarat rule by reading the rank of the card C delivered in the game in the card distributing device 3. The victory or defeat result of the game can also be determined by imaging the game table 4 with the camera 2, analyzing the image with the image analysis device 12, and collating the analysis result with the game rule with the fraud detecting device 13. In this case, the camera 2, the image analysis device 12, and the fraud detecting device 13 constitute a victory or defeat result determination device. The information about the player of each play position 7 and what type of and how many game token 120 is betted on which position (player, banker, pair) in the bet area 8 is obtained by imaging the game token 120 placed in the bet area 8 with the camera 2 to analyze the table image data in each play position 7 with the image analysis device 12.

The increase or decrease amount of the game token 120 in the upper tray 171 before and after the collection of the game token 120 of the player 6L who loses the game and the payout of the game token 120 to the player 6W who loses the game can be calculated by comparing the total amount of the game token 120 in the upper tray 171 before the settlement (that is, the collection and the payment) to the total amount of game token 120 in the upper tray 171 after the settlement. The total amount of game token 120 in the upper tray 171 before the settlement and the total amount of game token 120 in the upper tray 171 after the settlement can be detected by imaging the upper tray 171 storing the game token 120 with the camera 2 to analyze the tray image data with the image analysis device 12.

For example, it is assumed that Bb is the total amount of game token 120 of the upper tray 171 before the start of the game, and that Ba is the total amount of the game token 120 of the game token tray 17 after the game is completed to perform the settlement. In the game, it is assumed that bp is the total amount of all the play positions 7 of game token 120 betted in the player area 8, that bb is the total amount of all the play positions 7 of the game token 120 betted in the banker area, and that bt is the total amount of all the play positions 7 of the game token 120 betted on the tie area. For example, when the victory and defeat result of the game is the win of the banker, Ba−Bb=bp−bb+bt holds. Alternatively, the total amount Ba of the game token 120 of the game token tray 17 after the game should be (Bb+bp−bb+bt). When (Ba−Bb=bp−bb+bt) or (Bb+bp−bb+bt) does not hold, it can be determined that the fraud or the mistake is generated in the settlement of the game token 120 after the game.

The image analysis device 12 grasps the position, the type, and the number of the game token 120L bet by the player 6L who loses the game, and the fraud detecting device 13 calculates the increase amount of the game token 120L in the game (the expected amount of the game token 120 in the game token tray 171). The image analysis device 12 grasps the actual total amount of game token 120 in the game token tray 171 after the collection, and the fraud detecting device 13 determines whether the expected total amount is matched with the actual total amount.

In the payment of the game token 120W to the player 6W who wins the game, a sufficient time the image analysis device 12 and the fraud detecting device 13 grasp the actual total amount of the game token 120 in the sideways storage unit 174 after the collection can be secured using the game token 120 in the vertical orientation storage unit 173 of the upper tray 171.

When determining that the fraud settlement is performed, the fraud detecting device 13 records the time in the game recording device 11. At this point, the fraud detecting device 13 may record that the fraud is performed in association with the image data that becomes a basis for determining that the fraud settlement is performed. Consequently, the image in which the fraud is performed can be reproduced when the image is verified later.

When determining that the fraud settlement is performed, the fraud detecting device 13 may immediately output an alarm such that at least the dealer 5 can perceive the fraud settlement. As a result, the dealer 5 can prevent the further fraud by, for example, canceling the subsequent game. In this case, it is not necessary to record the image data, the tag information, the result of the image analysis, and the like in the game recording device 11.

As described above, the fraud detecting device 13 determines that the fraud is generated when the calculated adjusted amount is not matched with the increase or decrease of the actual game token 120. For this reason, the fraud detecting device 13 also detects a mismatch due to not the intentional fraud but an error as the "fraud". That is, the "fraud" in the embodiment includes those due to an unintentional mistake.

In the process of progressing the game, a predetermined number (for example, 100) of game tokens 120 is moved from the upper tray 171 to the upper tray 172 when the game token 120 is no longer stored in the upper tray 171, and conversely, a predetermined number (for example, 100) of game tokens 120 is moved (replenished) from the lower tray 172 to the upper tray 171 when the game token 120 runs short in the upper tray 171. The fraud detecting device 13 determines whether the fraud such as pilfering of the game token 120 is performed in the movement of the game token 120 between the upper tray 171 and the lower tray 172.

The fraud detecting device 13 determines whether the game token 120 is correctly moved between the upper tray 171 and the lower tray 172 based on the information about the type and the number of the game token 120 stored in the upper tray 171, the information being obtained by analyzing the tray image data of the upper tray 171 by the image analysis device 12, and the information about the type and the number of the game token 120 in the tag information read by the RFID reading device 170. That is, the fraud detecting device 13 determines that the movement is normal (the fraud is not performed) when the increase or decrease amount of the game token 120 in the upper tray 171 corresponds to the increase or decrease amount of the game token 120 in the lower tray 172 before and after the movement, and the fraud detecting device 13 determines that the fraud is performed when the increase or decrease amount of the game token 120 in the upper tray 171 does not correspond to the increase or decrease amount of the game token 120 in the lower tray 172 before and after the movement.

When determining that the fraud movement is performed, the fraud detecting device 13 records the time in the game recording device 11. At this point, the fraud detecting device 13 may record that the fraud is performed in association with the image data as the basis for determining that the fraud movement is performed and the read data of the RF tag 125. Consequently, the image in which the fraud is performed can be reproduced when the image is verified later.

When determining that the fraud movement is performed, the fraud detecting device 13 may immediately output the alarm instead of or in addition to the recording in the game recording device 11. Consequently, a manager of the game arcade can prevent the further fraud by, for example, canceling the subsequent game. As described above, the fraud detecting device 13 determines that the fraud is performed when the amount of the game token 120 increased or decreased in the upper tray 171 is not matched with the amount of game token 120 increased or decreased in the lower tray 172. For this reason, the fraud detecting device 13 also detects a mismatch due to not the intentional fraud but an error as the "fraud". That is, the "fraud" in the embodiment includes those due to an unintentional mistake.

The fraud detecting device 13 always monitors the reading result of the RFID reading device 170 at a constant cycle (for example, one second cycle), and determined whether the fluctuation corresponds to the increase or decrease amount of the game token 120 in the upper tray 171 when the reading result fluctuates. Thus, the fraud can be detected when the number or the total amount of the game token in the lower tray 172 fluctuates (in this case, the increase or decrease corresponding to the fluctuation in the lower tray 172 is not generated in the upper tray 171) while the upper tray 171 is not removed (while the game token 120 is not moved between the upper tray 171 and the lower tray 172).

As described above, in the management system 100 for the table game of the embodiment, using the game token tray 17 having the double tray structure including the upper tray 171 and the lower tray 172, the game token 120 stored in the upper tray 171 is grasped by analyzing the image data, and the game token 120 stored in the lower tray 172 is grasped by reading the tag information from the RF tag 125.

At this point, because the RFID reading device 170 that reads the RF tag 125 of the game token 120 stored in the lower tray 172 does not read the RF tag 125 of the game token 120 stored in the upper tray 171, whether the tag information read by the RFID reading device 170 is derived from the game token 120 stored in the upper tray 171 or the game token 120 stored in the lower tray 172 is clear.

As described above, by the combination of the image data and the RF tag information, not only all the game tokens 120 stored in the game token trays 17 including upper and lower trays can be grasped, but also the movement between the upper tray 171 and the lower tray 172 can be grasped, and the fraud can be detected. What type of the game token 120 stored at which position of the upper tray 171 can be grasped using the image data for the upper tray 171 in which the delivery of the game token 120 with the player (the bet area 8 of the game table 4) is generated in each game.

The fraud detecting device 13 calculates a balance of the game token 120 from the amount of game token 120 bet on the game table 4 in each game and the victory and defeat result of the game, and verifies the increase or decrease of the game token 120 in the game token tray 17 after the game. When the miscalculation is detected in the verification, the fraud detecting device 13 generates the alarm, or adds the recording of the miscalculation to the recording of the video imaged with the camera 2. A casino operator can investigate a cause of the miscalculation by checking the video.

The fraud detecting device 13 of the embodiment adds or adds and subtracts the increase or decrease amount of the game token in the game calculated from the position, the type, and the number of the game token 120 betted by all the players 6 in the game to or from the total amount of the game token 120 in the game token tray 17 before the settlement of each game, compares the expected total amount of the game token 120 in the game token tray 17 after the settlement at the end of the game to the actual total amount of the game token 120 in the game token tray 17 at the end of the game obtained through the image analysis device 12, and determines whether the miscalculation is generated between the expected total amount and the actual total amount.

The fraud detecting device 13 grasps the position, the type, and the number of the game token 120 betted by each player through the image analysis device 12, grasps the actual total amount of the game token 120 in the upper tray 171 when the collection of all the game tokens 120 bet by the player who loses the game is ended, compares the expected total amount of the game token 120 in the upper tray 171 in which the increase amount of the upper tray 171 in the game calculated from the position, the type, and the number of the game token 120 betted by the player who loses the game is added to the total amount of the game token 120 in the upper tray 171 before the settlement of each game to the actual total amount of the game token 120 in the upper tray 171, and determines whether the miscalculation is generated between the expected total amount and the actual total amount.

As described above, the sideways storage unit 174 that collects and temporarily stores the game token 120 bet by the player who loses the game is provided in the upper tray 171, and the fraud detecting device 13 compares the expected total amount of the game token 120 in the sideways storage unit 174 in which the increase amount of the game token 120 to the game calculated from the position, the type, and the number of the game token 120L betted by the player who loses the game is added to the actual total amount of the game token 120 in the sideways storage unit 174, and determines whether the miscalculation is generated between the expected total amount and the actual total amount.

When the fraud detecting device 13 determines the miscalculation in which the grasped actual total amount of the game token 120 in the upper tray 171 of the dealer 5 of the game table 4 does not correspond to the increase or decrease amount of the game token 120 calculated from the total amount of the game tokens 120 bet by all the players and the victory and defeat result of the game, the game recording device 11 can give an index or time to the obtained video or specify and reproduce a collection scene or a payment scene of the game token 120 so as to be able to analyze the recording of the game in which the miscalculation is generated.

As described above, the fraud detecting device 13 obtains the total amount of the game token 120 in the upper tray 171 after the settlement at the end of the game through the image analysis device 12, and the determination after the settlement in this case is made when one of 1) to 4) is generated:

1) When the payment to the player who wins the game is ended,

2) When the card C used in the game is collected and discarded in a discard area or discard slot (not illustrated) of the game table 4, 3) When a predetermined button (a start button of the next game, an approval button of a victory and defeat result, and the like) attached to the victory and defeat result determination device (card distributing device 3) is pressed, and 4) When a marker indicating the victory and defeat is restored.

The fraud detecting device 13 has the artificial intelligence type or deep learning structure that can grasp the position (player, banker, pair) and the amount (the type and the number) of the game token 120 betted at each play position 7 of the game table 4, compare a victory and defeat history of each player 6 obtained by the victory and defeat result of each game and the obtained amount (winning amount) of the game token 120 to statistical data (big data) of a large number of past games, and extract the victory and defeat history of each player 6 and the obtained amount (winning amount) of the game token 120 as an abnormal situation (set by the casino) that is suspicious of the fraud.

Typically, the management system 100 for the table game includes the fraud detecting device 13 has the artificial intelligence type or deep learning structure that can compare the generation of the winning amount greater than or equal to a certain amount (one million dollar) or a situation in which the state in which the amount of the game token 120 bet when the game is lost is small while the amount of the game token 120 bet when the game is won is large is continued for several games at the play position 7 of a certain game table 4 to the statistical data (big data) of a large number of past games, and extract the situation as the abnormal situation.

The management control device 15 including the fraud detecting device 13 and the image analysis device 12 of the management system 100 specifies the individual player 6 at the play position 7 extracted as the abnormal situation and the individual player 6 at the play position 7 where the player 6 wins the game for the predetermined amount or more. The specification of the player 6 can be performed by performing the image recognition on the image of a face of each player using feature point extraction in the image analysis device 12. When the player 6 is specified, the fraud detecting device 13 gives an identity number (ID or the like) and records information about the specified player 6. When the specified player 6 leaves the seat and arrives at another game table 4, the fraud detecting device 13 has a warning function of notifying a user of the existence of the player 6 on another game table 4. Specifically, a pit manager who manages each game table 4 and a person in charge of each table (or a dealer) may be notified to further prevent an abnormal phenomenon.

The fraud detecting device 13 further includes a database that leaves a history of exchange between a bill K and the game token 120, refers to the database in units of a fixed time or one day, and compares and determines whether the amount of the grasped game token 120 in the game token tray 17 of the dealer 5 of the game table 4 is increased or decreased according to the payment amount of the game token 120 corresponding to the exchanged bill K, or the payment total amount of the bill K corresponding to the exchanged game token 120.

In the above example, the victory and defeat history of each play position 7 and the obtained amount (winning amount) of the game token 120 may be monitored without specifying the individual player 6. In this case, although the player 6 cannot be tracked when each player 6 leaves the seat, the abnormal situation in which the state in which the amount of the game token 120 bet when the game is lost is small while the amount of the game token 120 bet when the game is won is large is continued for several games at the specific play position 7 of one game table 4 can be detected. When such the play position 7 is detected, there is a suspicion that the fraud or the mistake is performed at the play position 7. The fraud or the mistake can be found out by verifying the video in which the play position 7 is imaged.

Specifically, the camera 2 is installed so as to image at least the game token 120 placed in the bet area 8 of the game table 4. The image analysis device 12 analyzes the image imaged by the camera 2, detects which one of the player, banker, and tie positions in the bet area 8 the game token is placed in each user position 7, and detects the amount of the placed game token. The card distributing device 3 also functions as a victory and defeat result determination device, and determines the victory and defeat result of the game.

The fraud detecting device 13 records (monitors) the victory and defeat history of each play position 7 and the amount of the obtained game token (the amount of the acquired game token) in the game recording device 11 based on the position (player, banker, or pair) in the bet area 8 where the game token 120 is placed. Only one of the victory and defeat history and the amount of the acquired game token may be recorded. When the victory and defeat history and/or the amount of the acquired game token is the abnormal situation (set by casino) by comparing the victory and defeat history and/or the amount of the acquired game token to the statistical data (big data) of a large number of past game, the fraud detecting device 13 specifies the player position 7 as the play position that is suspicious of fraud action.

When a certain player position 7 is suspicious of the fraud action, the management control system 100 may generate the alarm (light, sound, or vibration) such that at least the dealer 5 can perceive the fraud action at that time. Consequently, the continuation of the fraud action can be prevented by immediately interrupting the subsequent game. The information indicating that the fraud action is suspected may be added to the video imaged and recorded by the camera 2. Consequently, the cause of the suspicion of fraud action can be investigated by checking the video.

The management control system 100 of the embodiment in the game arcade including the game table 4 further has a function of performing an inspection during the exchange between the bill and the game token that is frequently performed on the game table 4. In the game arcade such as the casino, before the game, the player 6 exchanges the bills (cash or the like) for the game token at a predetermined game token exchange. However, when the player 6 runs out the game token, the player 6 can exchange the cash (bills) for the game token 120 on the game table (the baccarat table and the like) to continue the game without leaving the game table 4. However, at this point, there is an opportunity in which the fraud to be performed between the dealer 5 and the player 6.

On the game table (the baccarat table and the like), it is necessary to exchange the cash (bill) for the game tokens 120 when the game is not in progress. The card distributing device 3 can detect the start of dealing of the card and the end of dealing (decision time of the victory and defeat) in order to decide the victory and defeat of the game. For this reason, the card distributing device 3 detects the situation except for the distribution (dealing) of the card, and the fraud detecting device 13 detects the exchange of the bill for the game token 120 on the game table 4 in the situation except for the dealing of the card. During the dealing of the card (or other situations) can be detected based on information obtained from the action of the card distributing device 3 or the dealer 5.

The image analysis device 12 can analyze the image of the surface of the bill K to recognize the number and the amount of the bill. On the game table 4, whether the bill K exchanged for the game token 120 is authentic is determined by irradiating the bill with black light to detect an authentic mark of the bill. The image analysis device 12 has an artificial intelligence type or deep learning structure that can perform verification by the image analysis of the authentic mark, recognize the total amount of the game token evens if the plurality of game token are hidden at the blind spot of the camera 2, compare the total amount of the bills K presented onto the game table 4 by the player to the total amount of game tokens 120 presented from the dealer 5, and determine whether the total amount of the bills K presented onto the game table 4 by the player is matched with the total amount of game tokens 120 presented from the dealer 5.

The fraud detecting device 13 has an artificial intelligence type or deep learning structure that can compare and calculate whether the total amount of the game token 120 in the upper tray 17 of the game table 4 is increased or decreased according to the payment amount of the game token 120 corresponding to the exchanged bill after the bill is exchanged for the game token 120 to perform the settlement. The total amount of the game token 120 in the upper tray 171 of the dealer 5 can be detected by imaging the upper tray 171 storing the game token 120 with the camera 2 to analyze the image of the upper tray 171 with the image analysis device 12.

The fraud detecting device 13 verifies whether the increases or decrease of the amount of the game token 120 in the game token tray 17 before and after the exchange of the bill and the game token is matched with the exchange amount of the game token of the image analysis result on the game table 4. The amount of the paid bill may be input to the management control device 15 by key input or the like by the dealer 5, or the camera 2 images the game table 4 on which the bill is paid, and the image analysis device 12 may analyze the image to specify the amount of the paid bill.

As described above, the fraud detecting device 13, determine whether the decrease amount of the game token 120 from the game token tray 17 due to the exchange of the bill and the game token is matched with the amount of the bill paid from the player 6 to the dealer 5. The fraud detecting device 13 may be an intelligent control device and have an artificial intelligence type or deep learning structure that can compare and calculate whether a deposit amount by the dealer 5 (usually by key input or the like) is matched with a calculation amount of the bill of the image analysis result by the image analysis device 12.

The fraud detecting device 13 has an artificial intelligence type or deep learning structure that can compare and calculate whether the total amount of the bill input by the dealer on the game table 4 taken charge of by the dealer is matched with the total amount of the bill by the image analysis result of the image analysis device 12.

The fraud detecting device 13 compare and determine whether the amount of the grasped game token 120 in the game token tray 17 of the dealer 5 of the game table 4 is increased or decreased according to the payment amount of the game token 120 corresponding to the exchanged bill or the payment amount of the bill corresponding to the exchanged game token 120 after the bill and the game token 120 are exchanged.

The fraud detecting device 13 is a control device having an artificial intelligence type or deep learning structure that can obtain the information about the type and the number of the game token 120 even if a part or a whole of the game token is hidden in measuring and determining the type and the number of the game token 120.

Figure 16:
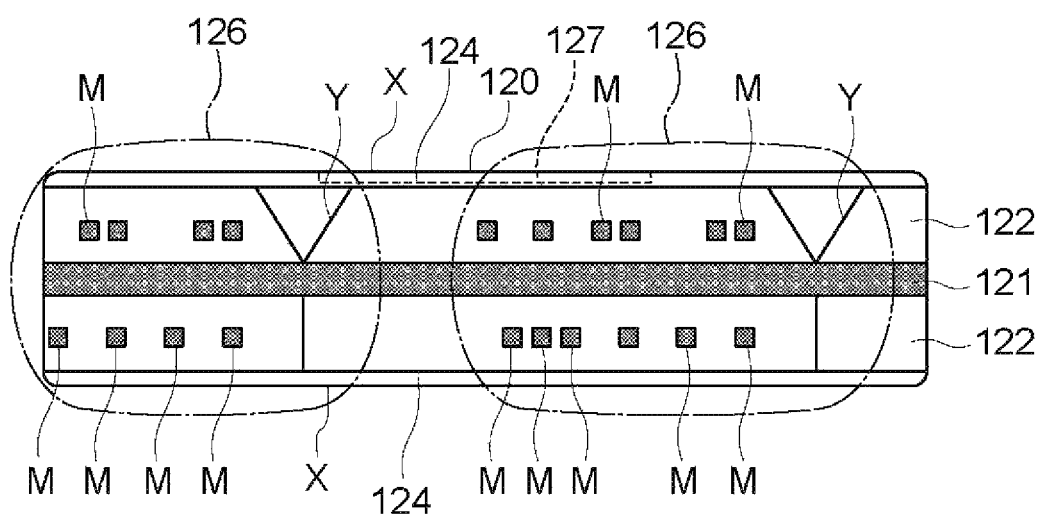
FIG. 16 is a side view illustrating a modification of the game token in the embodiment of the present invention.

FIG. 16 is a side view illustrating a modification of the game token 120. A plurality of plate-shaped plastic devices having different colors are laminated, integrated by means such as thermocompression bonding, and punched into a circular shape or a quadrilateral shape, thereby forming the game token 120. The game token 120 manufactured in this way has the specific color layer 121 at least in the middle and a multi-layer structure in which the light color layer 122 is laminated on both sides (up and down in FIG. 16) of the specific color layer 1121 in the middle.

In the multi-layer structure in which the specific color layer 121 is provided and the light color layer 122 is laminated on both sides of the specific color layer 121 in the middle, the stripe pattern is formed in the laminating direction when viewed from the side surface as illustrated in FIG. 16, and the type of the game token 120 can be specified by changing the color (red, green, yellow, blue, and the like) of the specific color layer 121 in each type (10 points, 20 points, 100 points, 1000 points, and the like) of the game token 120.

As illustrated in FIG. 16, in the game token 120, a side code 126 representing the type of the game token 120 is provided on the side surface of the light color layer 122. The transparent layer 124 is provided in the outermost layer, and each layer is thermocompression-bonded to form at least a five-layer structure. A state (five-layer structure or the like) in which the respective layers (at least the specific color layer 121 and the light color layer 122) are thermocompression-bonded to be in close contact with each other is formed using elongated plastic materials, and punched into a circular or rectangular shape by pressing or the like, thereby forming the game token 120.

When punching with a press, sizes of a mold, a die, and a punch are designed for punching by pressing, and an end of the outermost layer 124 is rounded. The transparent layer 124 may be a painted layer made of varnish. The side code 126 is attached to at least three points in the side surface of the game token 120. The side cord 126 is attached by ink jet printing using an ink that is visible by visible light.

In particular, in the modification, the side code 126 is configured by the presence or absence of marks M in a plurality of rows and a plurality of columns. As illustrated in FIG. 16, the marks M in the plurality of rows and the plurality of columns, the upper and lower marks M are paired to constitute a code. In the example of FIG. 16, a 10-digit code is configured.

Figure 17:
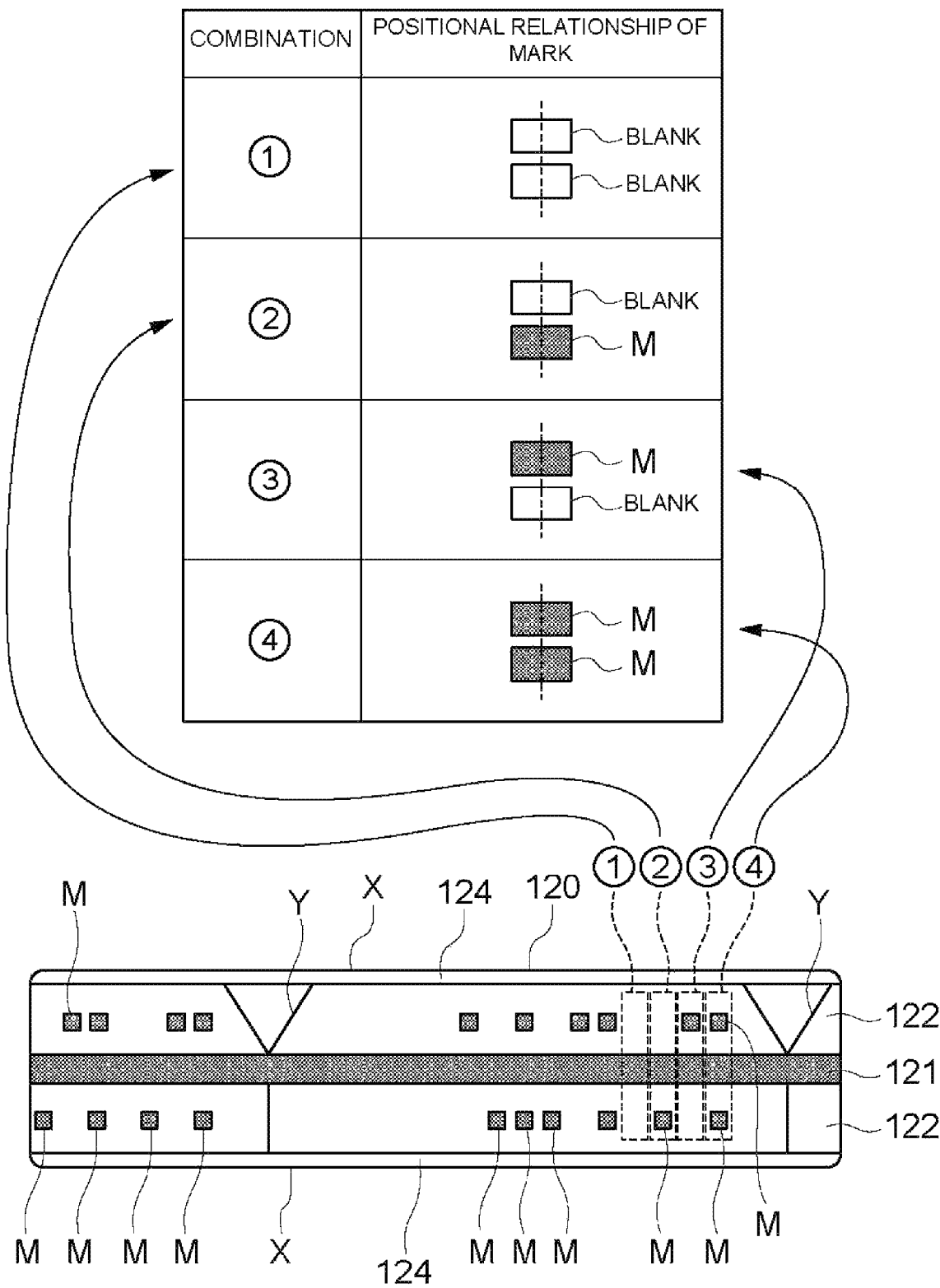
FIG. 17 is a view illustrating codes (four types) represented by a set of upper and lower marks in the embodiment of the present invention.

FIG. 17 is a view illustrating codes (four types) represented by a pair of upper and lower marks M. A letter "Y" next to the mark M is an identification mark identifying the upper side and the lower side of the mark. The code constructed with the marks M is configured such that a predetermined combination of the marks M can be specified. As a result, when ten lines of four types are printed as the combination of the marks M in the upper and lower lines in the example illustrated in FIG. 17, the codes of the tenth power of four types can be expressed. There are four types of 10-digit codes, and the codes of types of the tenth power of four is given, so that the again ID 126 of the game token 120 can sufficiently be given.

The game token 120 has the multi-layer structure in which the plurality of plastic layers having the different colors are laminated, at least one specific color layer 121 is provided, and the light color layer 122 is laminated outside the specific color layer 121, whereby the stripe pattern in the laminating direction is formed in the side surface, and the type of the game token 120 can be specified by the specific color layer 121. The side cord 126 is provided in at least three points (preferably six points) spaced apart in a circumferential direction in the side surface of the light color layer 122, and six side cords 126 are provided at a pitch of 60 degrees in the circumferential direction in the example of FIGS. 16 and 17.

The six side codes 126 indicate the same information. The separately identifiable (different one by one, uniquely identifiable) side code 126 is attached to the game token 120, and the side code 126 is provided at a pitch of 60 degrees in a rotational direction (circumferential direction) so as to be able to be always seen from the side. The side code 126 includes identification information capable of individually identifying the game token 120 (different one by one, uniquely identifiable), information indicating the type of the game token 120, and manufacturing information (manufacturing structure, manufacturing date, and the like).

The side code 126 attached to the game token 120 is read by the image analysis device 12. The management control device 15 includes a database (not illustrated), and the identification information, the types, and the manufacturing information of all the manufactured game tokens 120 (at least a possibility of being used in the game arcade) are stored in the database while association with one another.

The image analysis device 12 reads the side code 126 from the image data (the table image data and the tray image data). The fraud detecting device 13 specifies the identification information, the type, the manufacturing information, and the like of the game token 120 included in the image data based on the reading result of the image analysis device 12, and compares the combination of the identification information, the type, the manufacturing information, and the like to the information stored in the database.

When the game token 120 in which the information about the side code 126 read by the image analysis device 12 is not matched with the information stored in the database exists, the fraud detecting device 13 determines that the game token 120 is the fraud (forged or damaged) game token 120. When detecting the fraud in this manner, the fraud detecting device 13 records positional information about the fraud game token 120 and the time in the game recording device 11.

At this point, the fraud detecting device 13 may record positional information about the fraud game token 120 and the time while associating positional information about the fraud game token 120 and the time with the image data (the table image data or the tray image data) that is the basis for the determination of the fraud game token 120. Consequently, the image in which the fraud is performed can be reproduced when the image is verified later.

In the modification, the side code 126 is attached by inkjet printing using an ink that is visible by visible light. The side code 126 may be printed by an ink which is invisible by visible light (for example, an ink absorbing ultraviolet light), at least an ink that is visible by visible light (including ink that is very small and hardly visible), or a combination thereof. The side code 126 may be printed by combining a plurality of these types of inks.

The management system 100 includes a plurality of cameras corresponding to the ink by which the side code 126 is printed as the camera 2 (that is, a visible light camera when the ink is a visible ink, an infrared camera when the ink is an infrared reaction ink, and an ultraviolet camera (a UV irradiator and a visible light camera) when the ink is a UV ink) or a camera that can switch a plurality of functions of a camera corresponding to the ink (the visible light camera, the infrared camera, the ultraviolet camera (the UV irradiator and the visible light camera), and the like).

Figure 18:
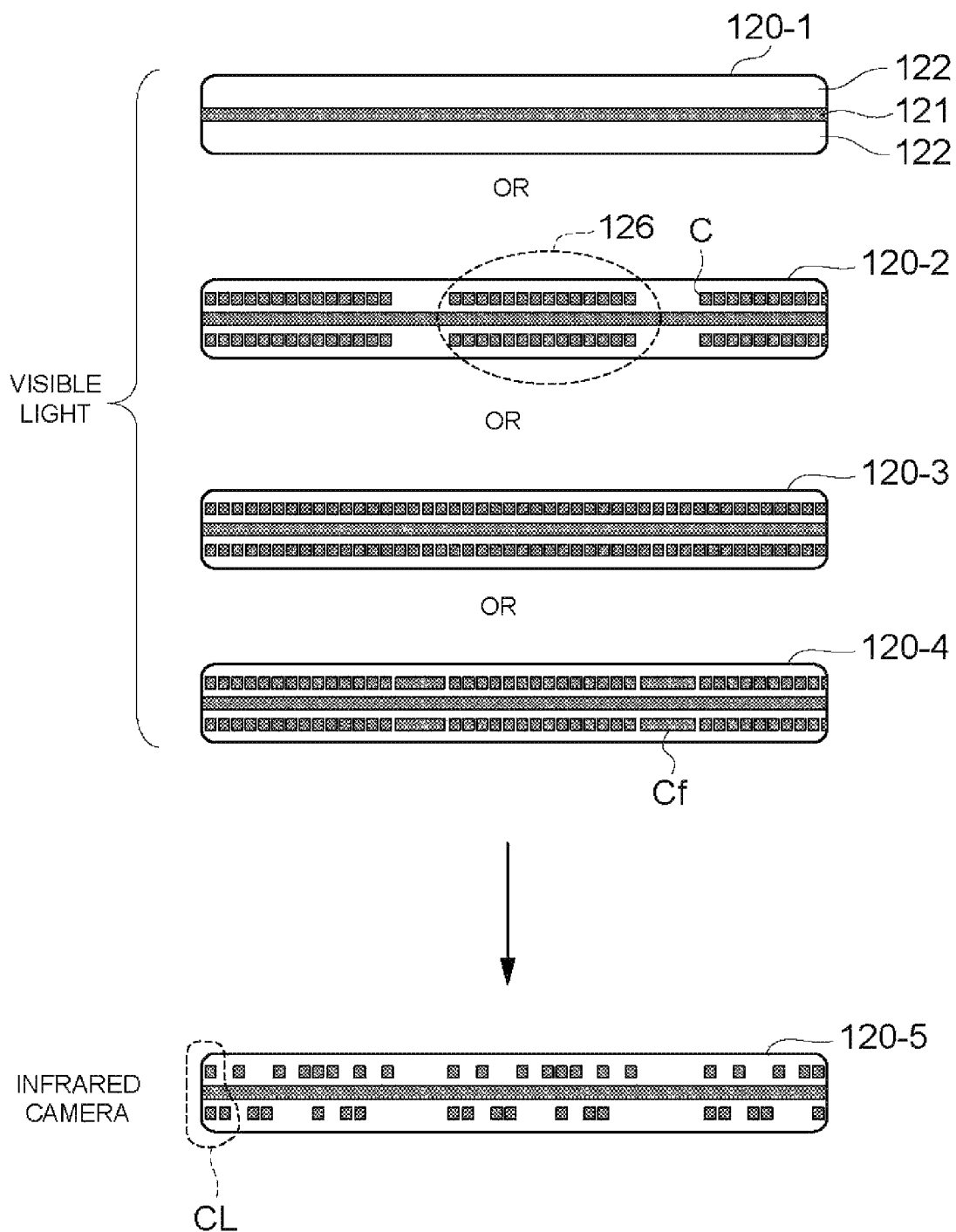
FIG. 18 is a side view illustrating another example of the side cord in the embodiment of the present invention.

FIG. 18 is a side view illustrating another example of the side cord. In a game token 120-1, the side code 126 is printed by an invisible ink (for example, ink absorbing infrared light). In a game token 120-2, the marks M in the plurality of lines and the plurality of columns are printed by ink that is seen in black by visible light. In a game token 120-3, in addition to the mark M of the game token 120-2, the mark M is printed by ink that is seen in black by visible light between the side codes 126, and the side code 126 is adapted to the design to become inconspicuous. In a game token money 120-4, the start and end points of the plurality of side codes 126 repeatedly attached are indicated by a mark Cf indicating the end.

When the game tokens 120-1 to 120-4 are seen with the infrared camera, the ink absorbing the infrared light absorbs the infrared light and is seen in black, so that the same side code 126 appears from either side surface. That is, an image of a game token 120-5 is obtained with the infrared camera. The upper and lower sides of the side code 126 are indicated by a mark CL indicating the upper and lower sides. The vertical relationship of the mark is as illustrated in FIG. 16. The side code 126 may be printed by the combination of the ink that is seen by visible light and the infrared absorbing ink.

The side code 126 attached to the game token 120 is read by the image analysis device 12. The image analysis device 12 can read the side code 126 of the game token 120 stored in the upper tray 171 of the game token tray 17 and the side code 126 of the game token 120 placed on the game table 4.

Figure 19:
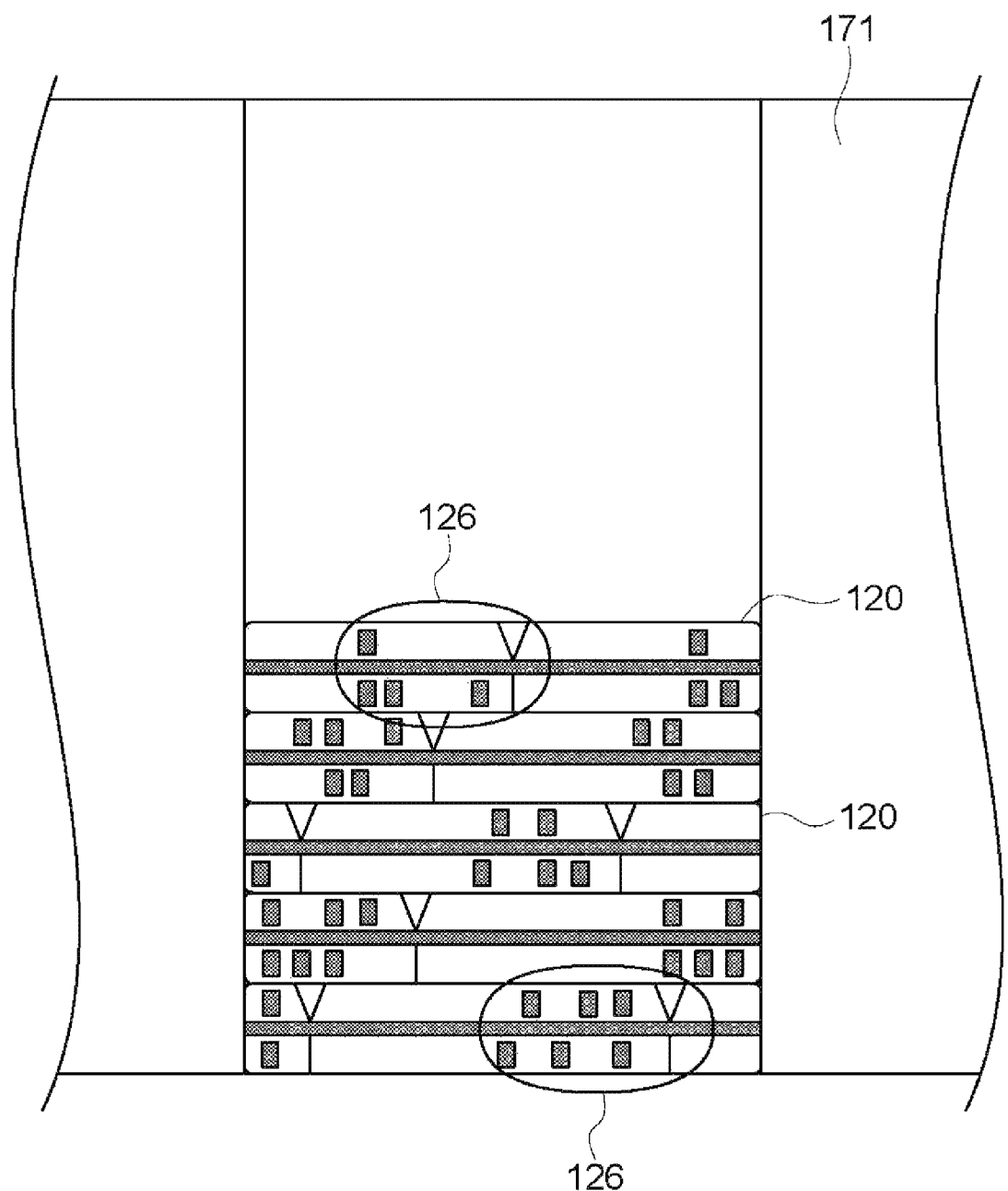
FIG. 19 is a view illustrating tray image data of the game token stored in the upper tray of the game token tray in the embodiment of the present invention.

FIG. 19 is a view illustrating the tray image data of the game token 120 stored in the upper tray 171 of the game token tray 17. In the tray image data, the game tokens 120 are laminated horizontally (laterally). The image analysis device 12 can also read the side code 126 from the tray image data. The image analysis device 12 can also read the side code 126 of the game token 120 on the game table 4 appearing in the table image data.

Figure 20:
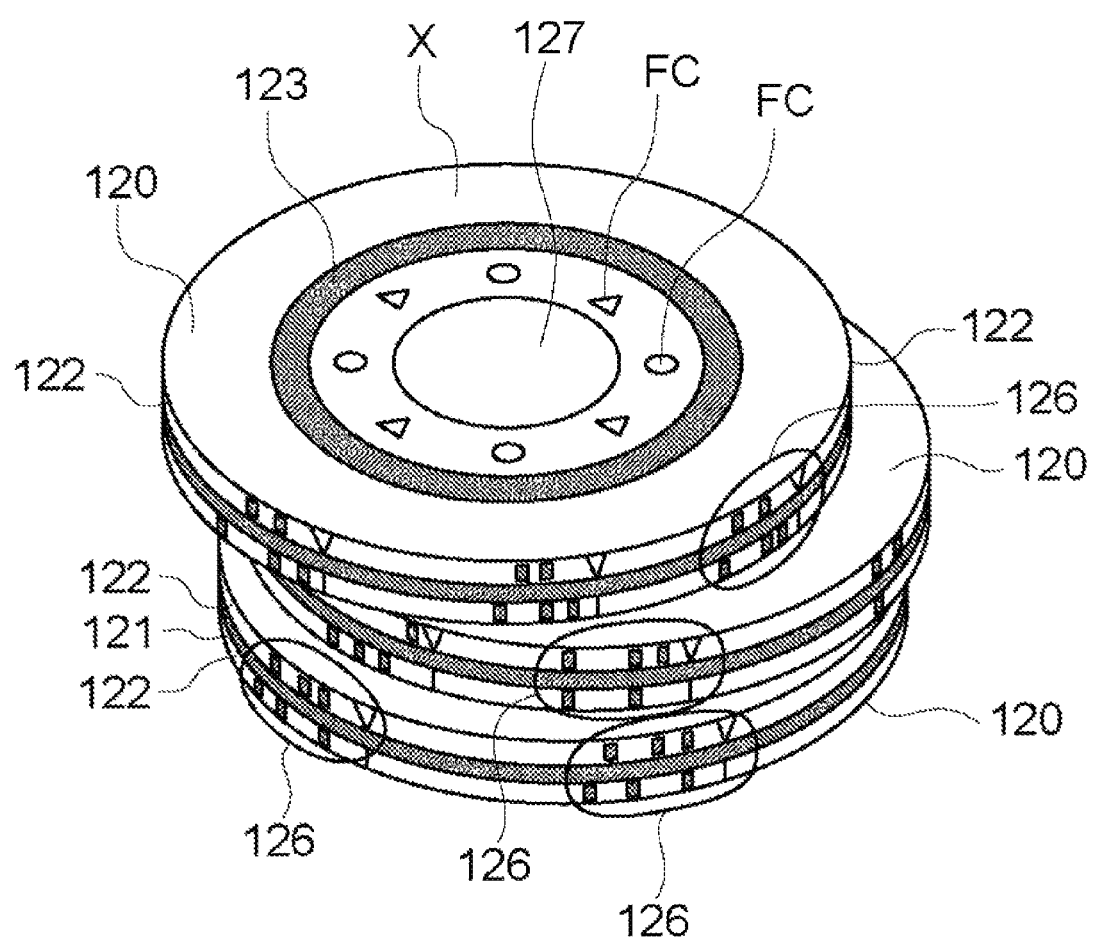
FIG. 20 is a perspective view of a plurality of game tokens stacked on the game table in the embodiment of the present invention.

FIG. 20 is a perspective view illustrating the plurality of game tokens stacked on the game table 4. In the game token 120, a face code FC made of a UV ink or ink (carbon black ink) absorbing the ultraviolet light is provided in a surface X of the light color layer 122. The face code FC represents the authenticity of the game token 120. When the face code FC is irradiated with the ultraviolet (or infrared) light, the face code FC becomes visible, and the authenticity of the game token 120 is represented by the combination of the shapes and the numbers of the face code FC.

The transparent layer (printed layer) 124 is thermocompression-bonded or coated (coated) to the outermost layer of the surface so as to cover a printing 123 (10 points or the like) specifying the game arcade and the face code FC. The transparent layer 124 is subjected to embossing or varnishing to prevent the game tokens 120 from adhering to each other and to improve slipping. In the game token 120, a circular depression 127 is provided in the centers of the top and bottom surfaces. In the game token 120, the depression 127 prevents the game tokens 120 from adhering to each other, and the slipping of the game token 120 is improved by increasing a diameter of the depression 127.

The end of the outermost transparent layer (printed layer) 124 to which the printing 123 (such as 100 points) is performed is subjected to R processing (R), and the surface of the light color layer 122 is prevented from being deformed and appearing on the side in the process of punching the game token 120. The commercial end of the game token 120 is prevented from damaging a receiver or other game tokens 120.

The specific color layer 121 may be formed by at least one colored layers. Metal or ceramic may be provided in the specific color layer 121 in order to increase the weight of the layer. Specifically, for example, the material for the layer in the layer of the specific color layer 121 may contain metal powders (for example, one of zinc oxide and titanium oxide or a plurality of metal oxides) for the purpose of the increase in weight. A hollow is provided in a part of the specific color layer 121, or a space is provided between the specific color layer 121 and the light color layer 122 and the RF tag 125 is incorporated in the space. The information in partially or wholly common with the information indicated by the side code 126 is stored as the tag information in the RF tag 125.

The fraud detecting device 13 detects a fraud game token 120 by collating the side code 126 read from the image data (the table image data and the tray image data) by the image analysis device 12 with the information stored in the database. Specifically, the fraud detecting device 13 determines that the fraud game token 120 exists:

1) when the side code 126 that does not exist in the database exists, and 2) when at least two same side codes exist.

As described above, the player 6 can exchange the cash for the game token in the cashier, and also exchange the cash for the game token 120 on the game table 4. The cameras 2L, 2R image the bill placed on the game table 4 in order to exchange the bill for the game token 120. That is, the plurality of cameras 2L, 2R that image the game token 120 on the game table 4 are disposed at different positions.

The fraud detecting device 13 specifies the type and the number of game token that should be paid from the upper tray 171 during the exchange of the game token 120 and the bill based on the recognition result of the bill by the image analysis device 12. The fraud detecting device 13 compares the actual total amount of the game token 120 stored in the upper tray 171 before the payment to the actual total amount of the game token 120 stored in the upper tray 171 after the payment, and determines whether the difference corresponds to the type and the number of the specified game token 120 that should be paid.

That is, the fraud detecting device 13 compares and determines whether the total amount of the grasped game token 120 in the upper tray 171 corresponds to the increase or decrease according to the payment amount of the game token 120 corresponding to the exchanged bill after the exchange of the bill and the game token 120. When the collection and the payment are simultaneously performed according to the victory and defeat result of the game, the fraud detecting device 13 compares and determines whether the amount of the game tokens 120 betted by all the players 6 corresponds to the increase or decrease of the game token 120 calculated from the victory and defeat result of the game.

The fraud detecting device 13 is the control device having the artificial intelligence type or deep learning structure that can obtain the information about the type and the number of the game token 120 even if a part or a whole of the game token 120 is hidden in determining the type and the number of the game token 120.

As described above, in the game token 120, the side cord 126 is attached to at least three points spaced apart in the rotational direction (circumferential direction) in the light color layer 122 of the side surface. The type and the manufacturing information of the game token 120 can be specified by reading the side code 126 with the image analysis device 12. The information specified in this way is collated with the database.

Figure 21:
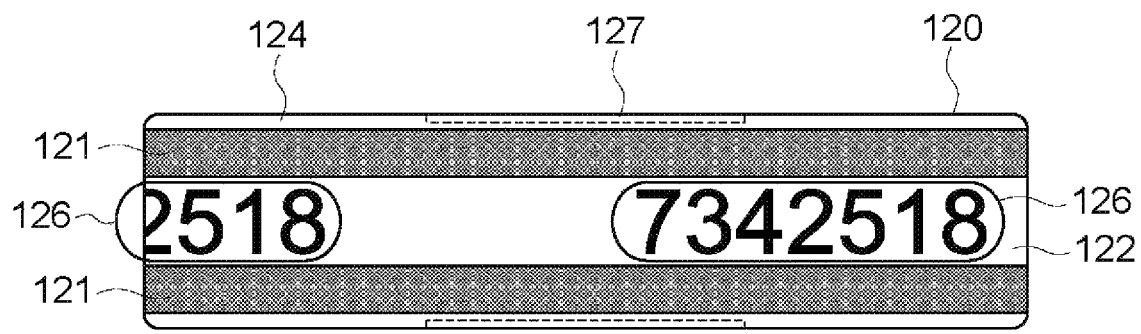
FIG. 21 is a side view illustrating the game token of still another example in the embodiment of the present invention.

FIG. 21 is a side view illustrating still another example of the game token. In the example of FIG. 21, the light color layer 122 is provided in the center of the side surface of the game token 120, and the specific color layer 121 is provided above and below the light color layer 122. In the light color layer 122 sandwiched between the specific color layers 121, a 7-digit numerals are printed as the mark of the side code 126, and the numerals constitute the side code 126. The combinations of the numerals are ways of the seventh power of ten, so that the side codes 126 of ways of the seventh power of ten can be attached. The image analysis device 12 recognizes a 10-digit numeral by performing the image recognition based on the machine learning.

INDUSTRIAL APPLICABILITY

In the configuration of the present invention, the position and movement of the game token can be recognized to detect the fraud by performing the imaging with the camera for the upper tray used to take in and out the game token during the settlement of the game, and the RF tag can be read even if the upper tray is stacked and the RF tag is not read for the game token of the upper tray for the lower tray in which the game token for replenishment is stored, so that the effect that the game token stored in the lower tray can be grasped by reading the RF tag, and the present invention is useful as the game token.

REFERENCE SIGNS LIST

100 table game management system
120 game token
121 specific color layer
122 light color layer
123 printing
124 transparent layer
125 RF tag
126 side cord
127 depression
11 game recording device
12 image analysis device
13 fraud detecting device
15 management control unit
17 game token tray
170 RFID reading device
171 upper tray
172 lower tray
173 vertical orientation storage unit
174 sideways storage unit
175 vertical orientation storage unit
176 antenna
177 reader
178 chain
179a, 179b link
2 camera
3 card distributing device
4 game table
5 dealer
6 player

The invention claimed is:

1. A game token tray system comprising:
a game token tray comprising:
an upper tray, wherein game tokens, in which respective radio frequency (RF) tags are embedded and to which respective identification information is assigned, can be placed onto and removed from the upper tray during settlement of a game; and
a lower tray in which the game tokens are storable;
a first reader, wherein the first reader is configured to read the identification information assigned to the game tokens from the RF tags of the game tokens while the game tokens are on the lower tray;
a second reader that is a different reader from the first reader, wherein the second reader is configured to read the identification information of the game tokens while the game tokens are on the upper tray; and
a controller, wherein:
the controller is configured to determine a total amount of the game tokens placed on the game token tray by using the identification information read by the first reader and the identification information read by the second reader;
the upper tray and the lower tray are configured to be in a stacked state in which the upper tray is stacked on the lower tray and in an open state in which the game tokens can be placed onto and removed from the lower tray; and
the first reader is configured so that the RF tags of the game tokens placed on the upper tray are not readable by the first reader when the upper and lower trays are in the stacked state, and/or the second reader is configured so that the identification information of the game tokens placed on the lower tray are not readable by the second reader when the upper and lower trays are in the stacked state.

2. The game token tray system according to claim 1, wherein the second reader is configured so that the identification information of the game tokens placed on the lower tray are not readable by the second reader when the upper and lower trays are in the stacked state.

3. The game token tray system according to claim 1, wherein the first reader is configured so that the RF tags of the game tokens placed on the upper tray are not readable by the first reader when the upper and lower trays are in the stacked state.

4. The game token system according to claim 1, wherein the controller is configured to detect a movement of one or more of the game tokens between the upper tray and the lower tray based on the identification information read by the first reader and the identification information read by the second reader.

5. The game token system according to claim 1, wherein the controller is configured to determine respective total amounts of the game tokens on each of the upper tray and the lower tray, respectively, based on the identification information read by the first reader and the identification information read by the second reader.

6. A game token tray system comprising:
a game token tray comprising:
an upper tray, wherein game tokens, in which respective radio frequency (RF) tags are embedded and to which respective identification information is assigned, can be placed onto and removed from the upper tray during settlement of a game; and
a lower tray in which the game tokens are storable;
a first reader, wherein the first reader is configured to read the identification information assigned to the game tokens from the RF tags of the game tokens while the game tokens are on the lower tray;
a second reader that is a different reader from the first reader, wherein the second reader is configured to read the identification information of the game tokens while the game tokens are on the upper tray; and
a controller, wherein:
the controller is configured to determine a total amount of the game tokens placed on the game token tray by using the identification information read by the first reader and the identification information read by the second reader;
the upper tray and the lower tray are configured to be in a stacked state in which the upper tray is stacked on the lower tray and in an open state in which the game tokens can be placed onto and removed from the lower tray; and
the first reader is configured so that the RF tags of the game tokens placed on the upper tray are not readable by the first reader when the upper and lower trays are in the open state, and/or the second reader is configured so that the identification information of the game tokens placed on the lower tray are not readable by the second reader when the upper and lower trays are in the open state.

7. The game token tray system according to claim 6, wherein the second reader is configured so that the identification information of the game tokens placed on the lower tray are not readable by the second reader when the upper and lower trays are in the open state.

8. The game token tray system according to claim 6, wherein the first reader is configured so that the RF tags of the game tokens placed on the upper tray are not readable by the first reader when the upper and lower trays are in the open state.

9. The game token system according to claim 6, wherein the controller is configured to detect a movement of one or more of the game tokens between the upper tray and the lower tray based on the identification information read by the first reader and the identification information read by the second reader.

10. The game token system according to claim 6, wherein the controller is configured to determine respective total amounts of the game tokens on each of the upper tray and the lower tray, respectively, based on the identification information read by the first reader and the identification information read by the second reader.

11. A game token tray system comprising:
a game token tray comprising:
an upper tray, wherein game tokens, in which respective radio frequency (RF) tags are embedded and to which respective identification information is assigned, can be placed onto and removed from the upper tray during settlement of a game; and
a lower tray in which the game tokens are storable;
a first reader, wherein the first reader is configured to read the identification information assigned to the game tokens from the RF tags of the game tokens while the game tokens are on the lower tray;
a second reader that is a different reader from the first reader, wherein the second reader is configured to read the identification information of the game tokens while the game tokens are on the upper tray; and
a controller, wherein:
the controller is configured to determine a total amount of the game tokens placed on the game token tray by using the identification information read by the first reader and the identification information read by the second reader;
the upper tray and the lower tray are configured to be in a stacked state in which the upper tray is stacked on the lower tray and in an open state in which the game tokens can be placed onto and removed from the lower tray; and
the first reader is configured so that the RF tags of the game tokens placed on the upper tray are not readable by the first reader when the upper and lower trays are in at least one of the stacked state and the open state, and/or the second reader is configured so that the identification information of the game tokens placed on the lower tray are not readable by the second reader when the upper and lower trays are in at least one of the stacked state and the open state.

12. The game token tray system according to claim 11, wherein the second reader is configured so that the identification information of the game tokens placed on the lower tray are not readable by the second reader when the upper and lower trays are in at least one of the stacked state and the open state.

13. The game token tray system according to claim 11, wherein the first reader is configured so that the RF tags of the game tokens placed on the upper tray are not readable by the first reader when the upper and lower trays are in at least one of the stacked state and the open state.

14. The game token system according to claim 11, wherein the controller is configured to detect a movement of one or more of the game tokens between the upper tray and the lower tray based on the identification information read by the first reader and the identification information read by the second reader.

15. The game token system according to claim 11, wherein the controller is configured to determine respective total amounts of the game tokens on each of the upper tray and the lower tray, respectively, based on the identification information read by the first reader and the identification information read by the second reader.

* * * * *